(12) United States Patent
Yamada et al.

(10) Patent No.: US 9,221,344 B2
(45) Date of Patent: Dec. 29, 2015

(54) ASSEMBLY JIG OF CONTACT PLATE ASSEMBLY

(75) Inventors: Haruo Yamada, Tokyo (JP); Takeshi Kurita, Tokyo (JP); Fumio Mizushima, Tokyo (JP)

(73) Assignee: EAST JAPAN RAILWAY COMPANY, Tokyo (JP)

( * ) Notice: Subject to any disclaimer, the term of this patent is extended or adjusted under 35 U.S.C. 154(b) by 346 days.

(21) Appl. No.: 13/877,153

(22) PCT Filed: Sep. 30, 2011

(86) PCT No.: PCT/JP2011/072521
§ 371 (c)(1),
(2), (4) Date: Jun. 14, 2013

(87) PCT Pub. No.: WO2012/043785
PCT Pub. Date: Apr. 5, 2012

(65) Prior Publication Data
US 2013/0256073 A1 Oct. 3, 2013

(30) Foreign Application Priority Data
Sep. 30, 2010 (JP) ................................. 2010-222167

(51) Int. Cl.
*B60L 5/00* (2006.01)
*B60L 5/22* (2006.01)
*B60L 5/20* (2006.01)

(52) U.S. Cl.
CPC ... *B60L 5/22* (2013.01); *B60L 5/20* (2013.01); *B60L 2200/26* (2013.01)

(58) Field of Classification Search
CPC ............... B60L 5/20; B60L 5/22; B60L 5/08; B60L 5/205; B60L 5/18; B60L 5/00; B60L 5/32; B60L 5/19; B60L 5/24; B60L 5/38; B60L 2200/26
See application file for complete search history.

(56) References Cited

U.S. PATENT DOCUMENTS 2,231,739 A * 2/1941 Schaake ........................... 191/55
3,869,029 A * 3/1975 Kunio ............................. 191/49

(Continued)

FOREIGN PATENT DOCUMENTS

| JP | 6-54405 A | 2/1994 |
|----|-----------|--------|
| JP | 07-016503 A | 3/1995 |

(Continued)

OTHER PUBLICATIONS

Office Action and Search Report in Chinese Application No. 201180047065.6, mailed Jan. 4, 2015.

(Continued)

*Primary Examiner* — Jason C Smith
(74) *Attorney, Agent, or Firm* — Nixon Peabody LLP

(57) ABSTRACT

When a plurality of contact plate pieces are arranged on a loading part of a contact plate assembly jig, the plurality of contact plate pieces are arranged by a contact plate piece aligning part in a row. Further, the neighboring contact plate pieces are held by an interval holding part at a predetermined interval ($\Delta_1$). When a plurality of movable guide parts are arranged on a conductive part and a movable guide assembly jig is mounted on the contact plate assembly jig, sliding surfaces of the plurality of movable guide parts are arranged on the same plane in a row by aligning surfaces of movable guide aligning parts. When the contact plate piece and the movable guide part is prevented by the contact plate piece aligning parts, the interval holding part and the movable guide aligning part.

18 Claims, 25 Drawing Sheets

(56) References Cited

U.S. PATENT DOCUMENTS

| | | | | |
|---|---|---|---|---|
| 4,155,435 | A | * | 5/1979 | Kimura et al. ............... 191/58 |
| 4,471,175 | A | * | 9/1984 | Grönlund ..................... 191/66 |
| 5,351,794 | A | * | 10/1994 | Deutzer ..................... 191/55 |
| 5,975,259 | A | * | 11/1999 | Gebhard et al. ............ 191/50 |
| 8,596,435 | B2 | * | 12/2013 | Laurent et al. ............. 191/49 |
| 2002/0086558 | A1 | * | 7/2002 | Blanvillain ................. 439/32 |
| 2009/0211861 | A1 | * | 8/2009 | Okimoto et al. ........... 191/59.1 |
| 2010/0066396 | A1 | * | 3/2010 | Miura et al. ................ 324/757 |
| 2013/0256073 | A1 | * | 10/2013 | Yamada et al. ............. 191/60.2 |
| 2013/0270050 | A1 | * | 10/2013 | Yamada et al. ............. 191/59 |
| 2014/0202816 | A1 | * | 7/2014 | Kuo et al. ................... 191/59.1 |

FOREIGN PATENT DOCUMENTS

| | | |
|---|---|---|
| JP | 7-16503 U | 3/1995 |
| JP | 2005-160266 A | 6/2005 |

OTHER PUBLICATIONS

International Search Report, PCT/JP2011/072521, dated Dec. 27, 2011.

* cited by examiner

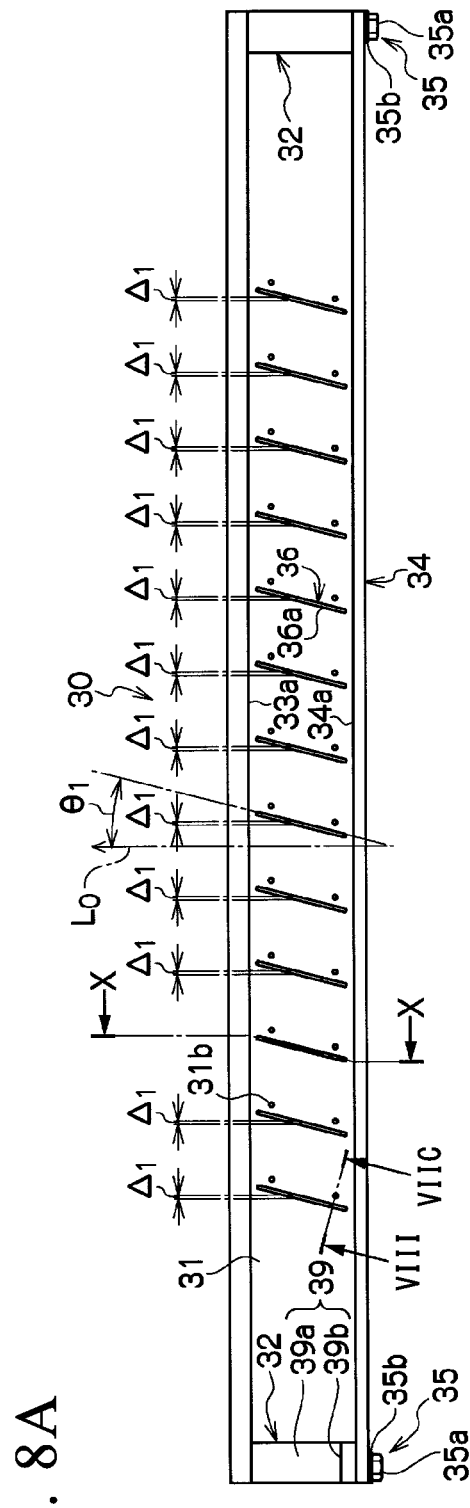

ASSEMBLY JIG OF CONTACT PLATE ASSEMBLY

CROSS REFERENCE TO RELATED APPLICATIONS OR PRIORITY CLAIM

This application is a National Phase of PCT/JP2011/072521, filed Sep. 30, 2011, entitled, "ASSEMBLY JIG OF CONTACT PLATE ASSEMBLY", which claims the benefit of Japanese Patent Application No. 2010-222167, filed Sep. 30, 2010, the contents of which are incorporated herein by reference in their entirety.

TECHNICAL FIELD

The present invention relates to an assembly jig of a contact plate assembly used when a contact plate assembly having a contact plate divided by a plurality of contact plate pieces in a longitudinal direction is assembled.

BACKGROUND ART

At the present time, traveling at 360 km/h on the Shinkansen (trademark) is being promoted. In this case, in a pantograph for the Shinkansen (trademark) of the related art type, current collection performance is insufficient. For this reason, a multi-segmentation contact plate body having only sufficient current collection performance in this speed range is likely to be employed. The multi-segmentation contact plate body of the related art includes a plurality of contact plate pieces slidably moving along a trolley wire of an overhead line, a flexible seat resiliently deformed according to movement of the plurality of contact plate pieces in upward and downward directions, a copper plate electrically connected to the plurality of contact plate pieces, a plurality of movable guides integrated with the plurality of contact plate pieces and movable in the upward and downward directions, a fixing guide part attached to a shoe body frame and configured to movably guide the movable guide, a stopper part configured to restrict movement of the movable guide part in the upward and downward directions, and a plurality of springs movably supporting the plurality of contact plate pieces in the upward and downward directions (for example, see Patent Document 1). In the multi-segmentation contact plate body of the related art, the contact plate is divided into the plurality of contact plate pieces in the longitudinal direction. For this reason, a weight of each of the contact plate pieces is reduced, and following performance to the trolley wire upon current collection is improved. As a result, separation of the contact plate piece from the trolley wire, i.e., a separation line, is reduced, and current collection performance is improved.

RELATED ART DOCUMENT

Patent Document

Patent Document 1:
Japanese Unexamined Patent Application, First Publication No. 2005-160266

SUMMARY OF THE INVENTION

Problems to be Solved by the Invention

The contact plate body of the related art, which does not have a multi-segmentation structure, has fewer parts than the multi-segmentation contact plate body of the related art. For this reason, the multi-segmentation contact plate body of the related art can be simply assembled in a short time without using a specific assembly jig or the like. Meanwhile, the multi-segmentation contact plate body of the related art has remarkably more parts constituting the contact plate assembly than the contact plate body of the related art. For this reason, in the multi-segmentation contact plate body of the related art, when the worn contact plate piece is replaced with a new contact plate piece to reassemble the contact plate assembly or when new contact plate pieces are assembled to manufacture a new contact plate assembly, the contact plate pieces need to be precisely arranged, and the contact plate assembly cannot be easily assembled in a short time. In addition, in the multi-segmentation contact plate body of the related art, in addition to precise arrangement of the multiple contact plate pieces, the multiple guide parts also need to be precisely arranged with respect to the multiple contact plate pieces. For this reason, in the multi-segmentation contact plate body of the related art, when an interval between the neighboring contact plate pieces is too small, the contact plate pieces interfere with each other. Further, when the multiple guide parts are unevenly arranged, the contact plate assembly cannot be fitted into the shoe body frame. Furthermore, in the multi-segmentation contact plate body of the related art, when the guide part and the contact plate piece are fastened by a bolt, the contact plate piece and the guide part may be rotated about the bolt to be deviated from each other. For this reason, in the multi-segmentation contact plate body of the related art, assembly of the contact plate assembly is time-consuming, the contact plate assembly cannot be precisely assembled easily, and manufacture precision cannot be easily accomplished.

The present invention provides an assembly jig of a contact plate assembly capable of easily and precisely assembling a contact plate assembly in a short time.

Means for Solving the Problems

The present invention solves the problems using solving means described below.

An assembly jig according to a first aspect of the present invention is an assembly jig of a contact plate assembly used when the contact plate assembly in which a contact plate is divided into a plurality of contact plate pieces in a longitudinal direction is assembled. The assembly jig according to the first aspect of the present invention includes a loading part on which the plurality of contact plate pieces are arranged and loaded; a contact plate piece aligning part configured to align the plurality of contact plate pieces such that the plurality of contact plate pieces are arranged on the loading part in a predetermined direction; and an interval holding part configured to hold the neighboring contact plate pieces at a predetermined interval such that the plurality of contact plate pieces are arranged on the loading part at the predetermined interval.

An assembly jig according to a second aspect of the present invention includes a movable guide aligning part configured to align a plurality of movable guide parts such that the plurality of movable guide parts moving with the plurality of contact plate pieces are arranged in the predetermined direction.

An assembly jig according to a third aspect of the present invention is an assembly jig of a contact plate assembly used when the contact plate assembly in which a contact plate is divided into a plurality of contact plate pieces in a longitudinal direction is assembled. The assembly jig according to the third aspect of the present invention includes a movable guide aligning part configured to align a plurality of movable guide parts such that the plurality of movable guide parts moving with the plurality of contact plate pieces are arranged in a predetermined direction.

In an assembly jig according to a fourth aspect of the present invention, the movable guide aligning part aligns the plurality of movable guide parts in the predetermined direction such that sliding surfaces of the plurality of movable guide parts side sliding with a sliding surface of a fixing guide part side configured to movably guide the plurality of movable guide parts form the same plane.

In an assembly jig according to a fifth aspect of the present invention, the movable guide aligning part prevents deviation of the plurality of movable guide parts when the plurality of contact plate pieces and the plurality of movable guide parts are fixed.

In an assembly jig according to a sixth aspect of the present invention, the movable guide aligning part includes an aligning surface configured to come in contact with the sliding surfaces of one end section side of the plurality of movable guide parts and come in contact with the sliding surfaces of the other end section side of the plurality of movable guide parts to align the sliding surfaces.

An assembly jig according to a seventh aspect of the present invention includes a contact plate piece positioning part configured to position the contact plate pieces disposed at both ends of the contact plate pieces on the loading part at a predetermined position such that the entire length of the contact plate becomes a predetermined length.

In an assembly jig according to an eighth aspect of the present invention, the contact plate piece positioning part positions a mounting part of the contact plate assembly at a predetermined position such that the mounting part of the contact plate assembly is detachably mounted on a mounting part of a shoe body frame side of a collector shoe.

An assembly jig according to a ninth aspect of the present invention includes a stopper guide part configured to guide a stopper part along a centerline of the plurality of movable guide parts when the stopper part configured to restrict a movable range of the plurality of movable guide parts moving with the plurality of contact plate pieces within a predetermined range is positioned at the plurality of movable guide parts.

In an assembly jig according to a tenth aspect of the present invention, the contact plate piece aligning part includes an aligning surface configured to come in contact with end surfaces of the plurality of contact plate pieces to align the end surfaces of the plurality of contact plate pieces.

In an assembly jig according to an eleventh aspect of the present invention, wherein the interval holding part includes protrusion sections protruding upward from the loading part at a predetermined interval in a longitudinal direction of the loading part.

Effect of the Invention

According to the assembly jig of the present invention, the contact plate assembly can be easily and precisely assembled in a short time.

BRIEF DESCRIPTION OF THE DRAWINGS

FIG. 8A is an outline plan view of a contact plate assembly jig of the assembly jig of the contact plate assembly according to the embodiment of the present invention.

MODES FOR CARRYING OUT THE INVENTION

Hereinafter, an embodiment of the present invention will be described in detail with reference to the accompanying drawings.

Figure 1A:
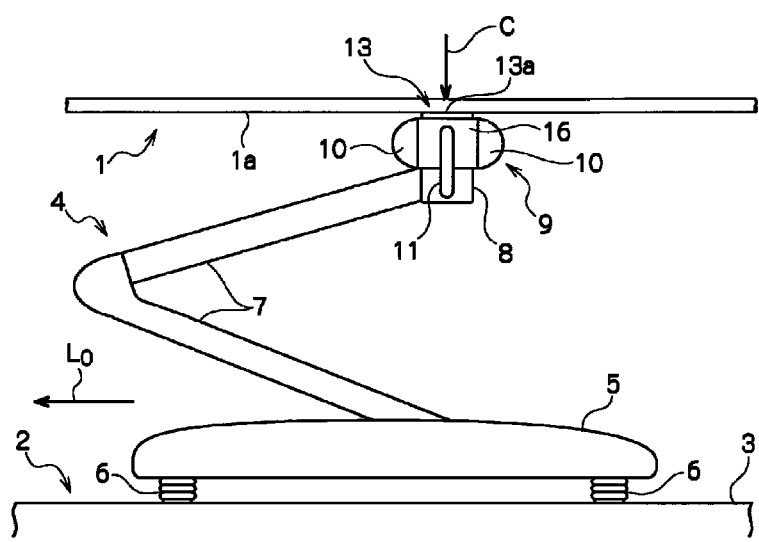
FIG. 1A is a schematic side view of a current collecting apparatus including a contact plate assembly assembled by an assembly jig of a contact plate assembly according to an embodiment of the present invention.
Figure 1B:
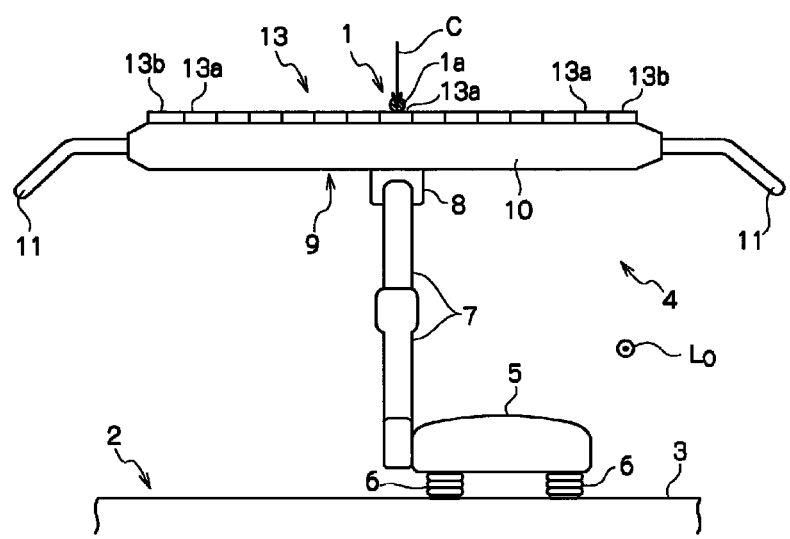
FIG. 1B is a schematic front view of the current collecting apparatus including the contact plate assembly assembled by the assembly jig of the contact plate assembly according to the embodiment of the present invention.

An overhead line 1 shown in FIGS. 1A and 1B is an electric-car line installed over a railroad, and is supported by support points at predetermined intervals. A trolley wire 1a is an electric wire, with which a contact plate 13 of a current collecting apparatus 4 comes in contact, and a load current is supplied to a vehicle 2 as the contact plate 13 is moved while contacting the trolley wire 1 a. The vehicle 2 is an electric car such as an electric train, an electric locomotive, or the like, for example, a railroad vehicle such as the Shinkansen (trademark), which travels at a high speed. A vehicle body 3 is a structure for loading and transporting passengers.

The current collecting apparatus 4 is an apparatus configured to induce power from the trolley wire 1a to the vehicle 2. The current collecting apparatus 4 includes an underframe 5, an insulator 6, a framework 7, a shoe support part 8, and a collector shoe (a shoe body) 9. The underframe 5 is a member configured to support the framework 7. The insulator 6 is a member configured to electrically insulate the vehicle body 3 from the underframe 5. The framework 7 is a link mechanism that can be operated in upward and downward directions while supporting the collector shoe 9. The shoe support part 8 is a member configured to horizontally lift the collector shoe 9 with respect to the overhead line 1. Further, the shoe support part 8 is a mechanism part configured to apply a shock absorbing action by a spring (not shown), which is lifted upward by an uplift spring (not shown) included in the underframe 5. The current collecting apparatus 4 shown in FIGS. 1A and 1B is a single arm type pantograph asymmetrically installed in a traveling direction Lo of the vehicle 2 and usable in one direction or both directions. The current collecting apparatus 4 progresses in a flap direction in which the contact plate 13 is disposed at a rear side in a traveling direction with respect to the framework 7.

Figure 2:
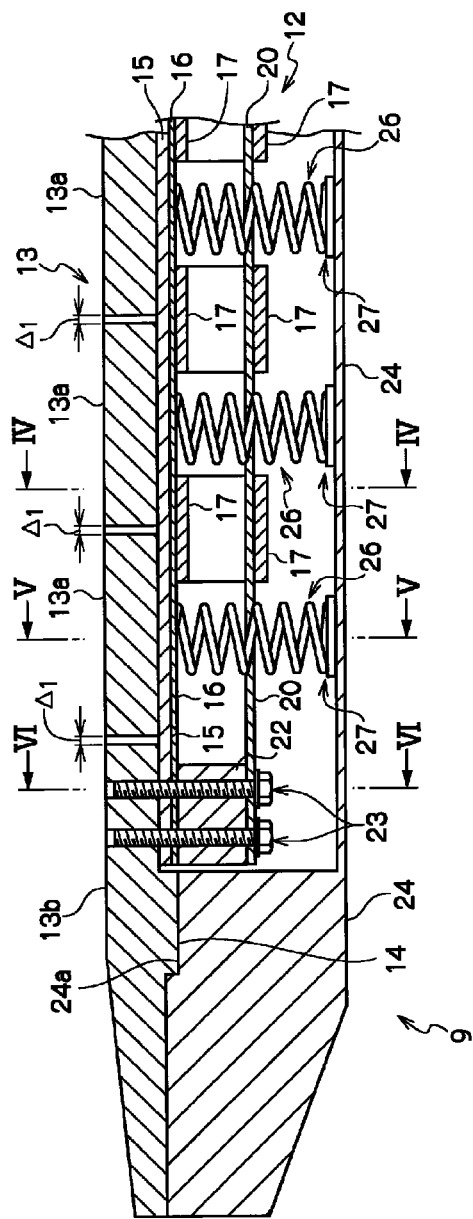
FIG. 2 is a cross-sectional view of a collector shoe including the contact plate assembly, a portion of which is omitted, assembled by the assembly jig of the contact plate assembly according to the embodiment of the present invention.

The collector shoe 9 shown in FIGS. 1A, 1B and 2 is a member configured to attach and support the contact plate 13, and in general, a long metal member elongated in a direction perpendicular to the trolley wire 1a. As shown in FIGS. 1B, 2, 3A and 3B, the collector shoe 9 is a multi-segmentation contact plate body in which the contact plate 13 is divided into a plurality of pieces. As the contact plate 13 is divided into a number of contact plate pieces 13a and 13b, a mass of the contact plate 13 in contact with the trolley wire 1a and excited is reduced, and a collector shoe of a pantograph for the Shinkansen (trademark) (high speed) having improved following performance with respect to the trolley wire 1a is provided. The collector shoe 9 includes a rectifying part 10 shown in FIGS. 4 to 6, a horn 11 shown in FIGS. 1A and 1B, a contact plate assembly 12 shown in FIGS. 2 to 6, a shoe body frame 24 shown in FIGS. 4 to 6, a fixing guide part 25 shown in FIGS. 4 and 5, a resilient support part 26 shown in FIGS. 2 and 5, a fixing part 27 shown in FIG. 5, and so on.

Figure 4:
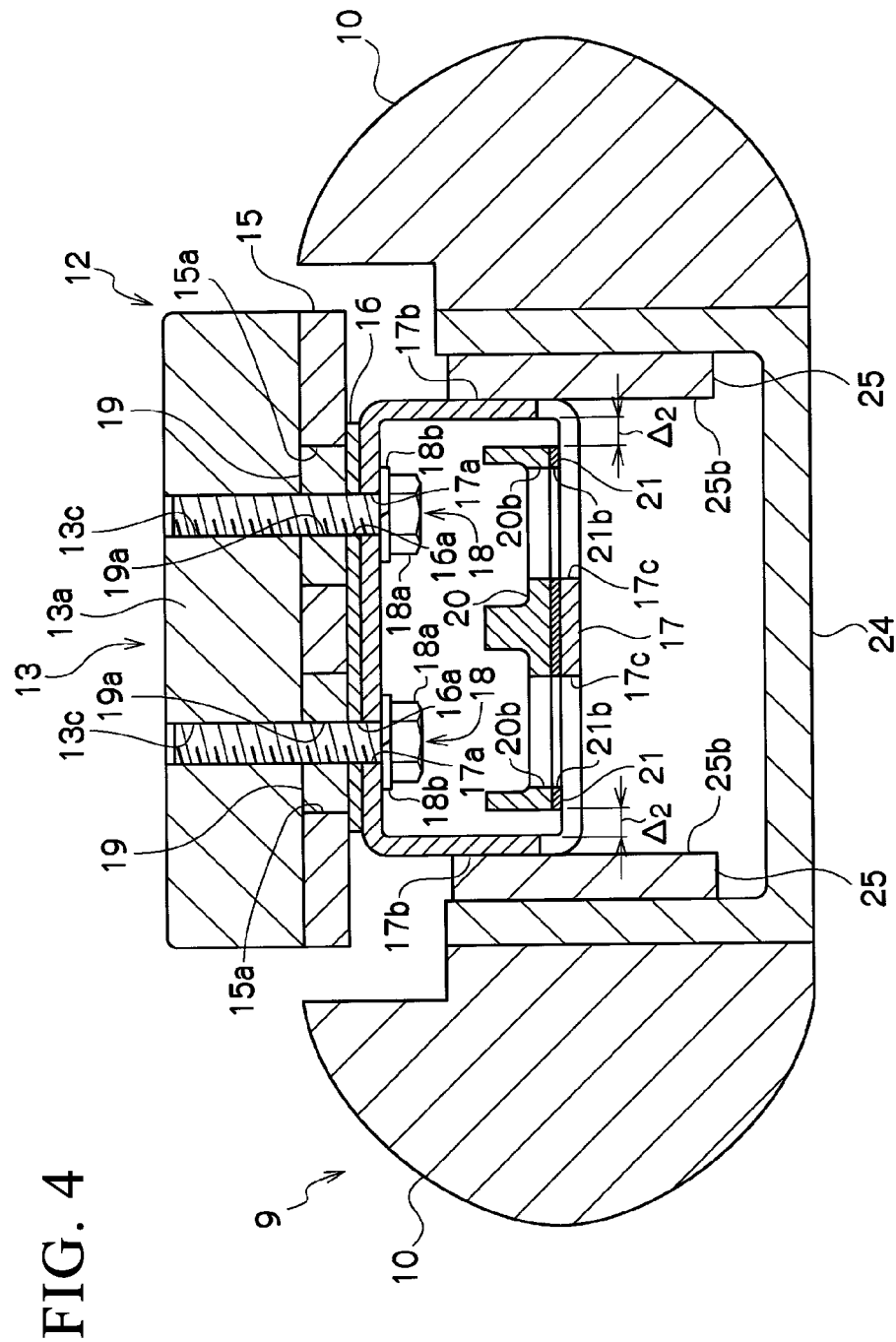
FIG. 4 is a cross-sectional view taken along line IV-IV of FIG. 2.
Figure 5:
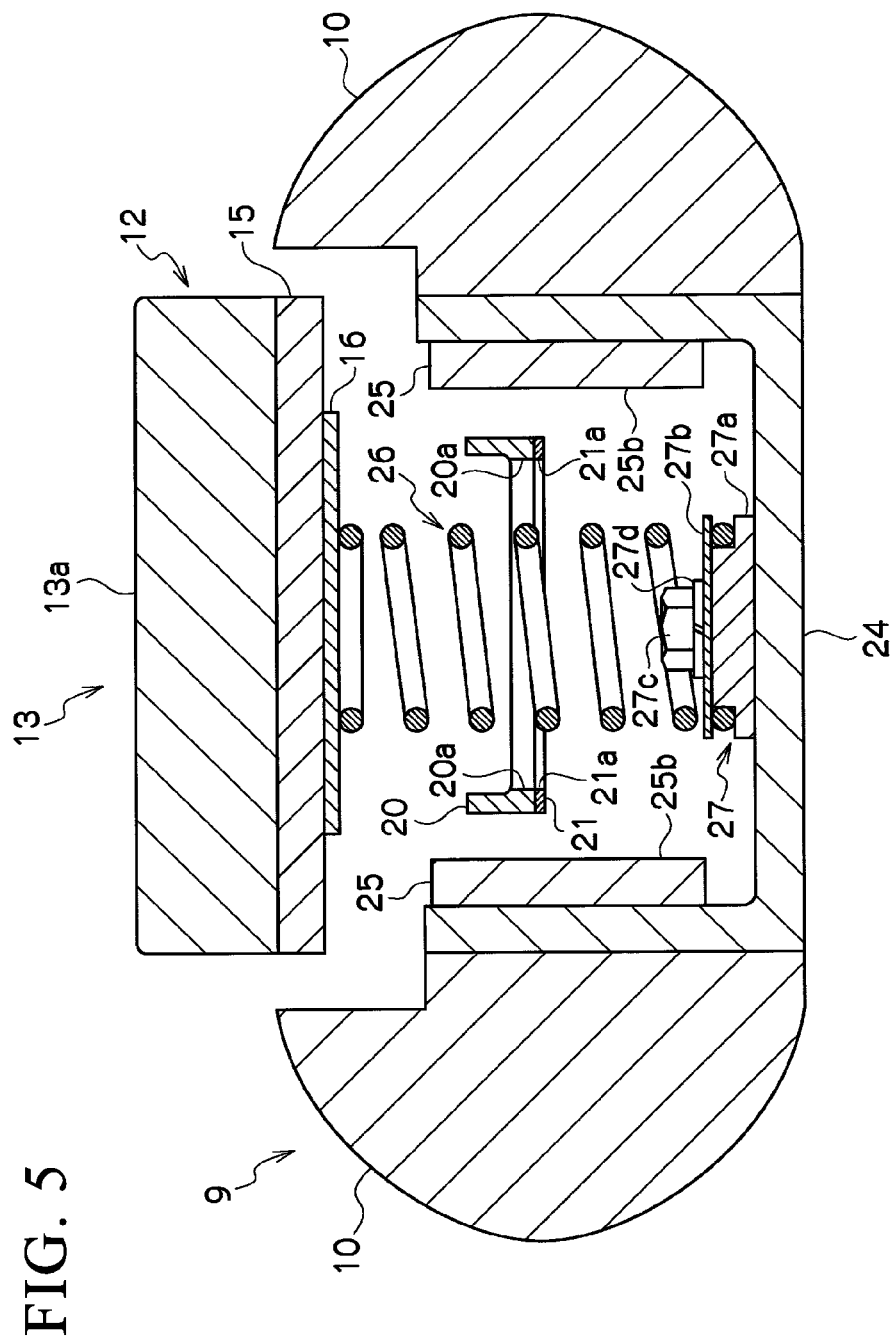
FIG. 5 is a cross-sectional view taken along line V-V of FIG. 2.
Figure 6:
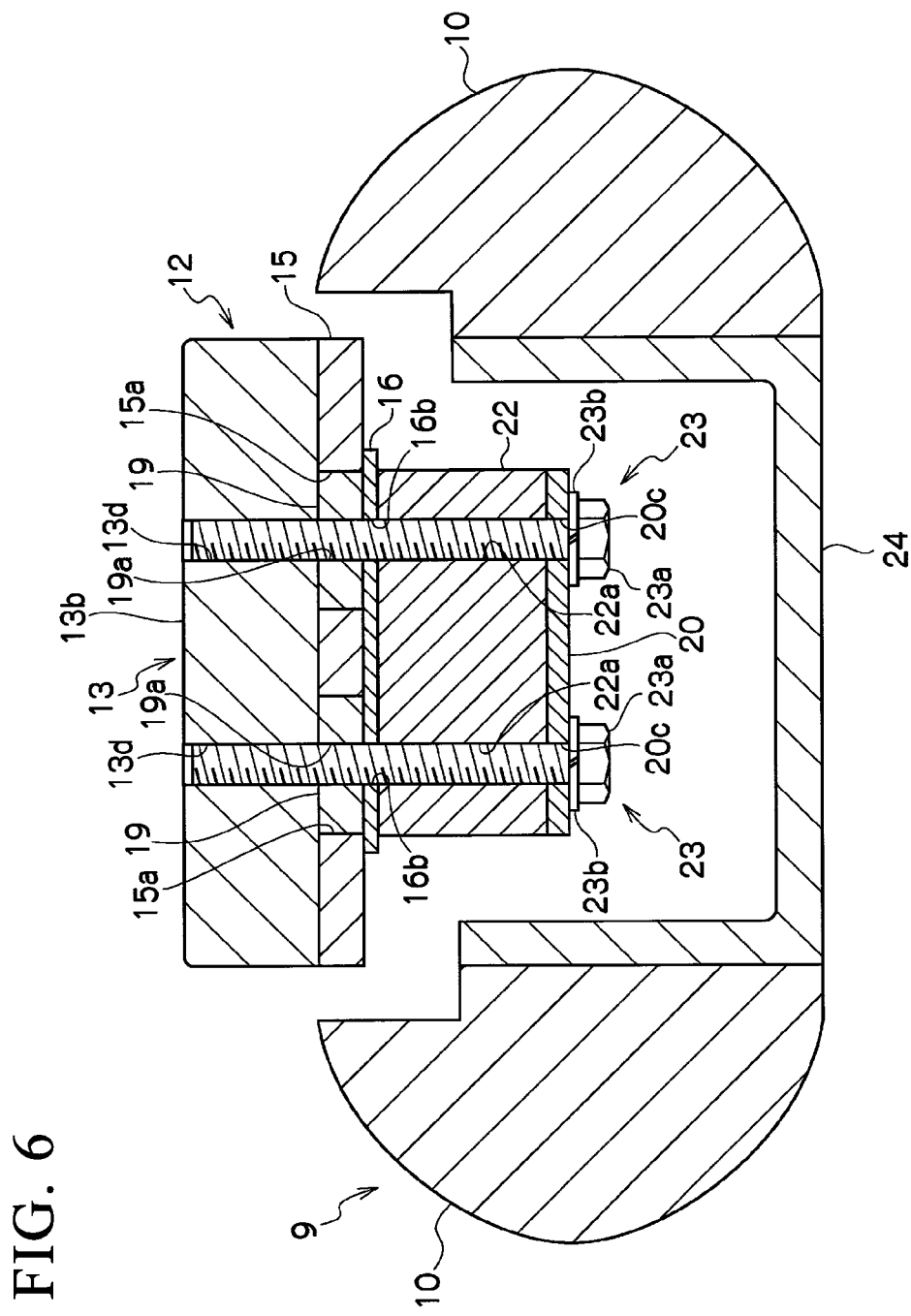
FIG. 6 is a cross-sectional view taken along line VI-VI of FIG. 2.

The rectifying part 10 shown in FIGS. 4 to 6 is a member configured to adjust a lifting power generated by an air stream. The rectifying part 10 is detachably installed at the shoe body frame 24 by a fixing member (not shown). A cross-sectional shape of the collector shoe 9 may be changed into an arbitrary shape by exchanging the rectifying part 10 with a member having an optimal shape.

The horn 11 shown in FIGS. 1A and 1B is a member configured to prevent interruption with the trolley wire 1a of the two trolley wires 1a crossing over a brancher in a direction different from the traveling direction of the vehicle 2 when the vehicle 2 passes the brancher. As shown in FIG. 1B, the horn 11 is a metal member formed to protrude from both end sections in a longitudinal direction of the collector shoe 9 and having a curved tip section.

The contact plate assembly 12 shown in FIGS. 2 to 6 is a member assembled by major components of the collector shoe 9. The contact plate assembly 12 is an assembled product (a contact plate body) assembled from the plurality of contact plate pieces 13a and 13b, a plurality of movable guide parts 17, and so on, in an aligned state. As shown in FIG. 2, the contact plate assembly 12 is fitted into the shoe body frame 24 of the collector shoe 9 to be integrated with the shoe body frame 24. The contact plate assembly 12 includes the contact plate 13 shown in FIGS. 1A to 6, a mounting part 14 shown in FIGS. 2, 3A and 3B, a resilient part 15 and a conductive part 16 shown in FIGS. 2 to 6, the movable guide part 17 shown in FIGS. 2, 3B and 4, a fixing part 18 and an interval adjustment part 19 shown in FIGS. 3A, 3B and 4, a stopper part 20 shown in FIGS. 2 to 6, a shock absorbing part 21 shown in FIGS. 4 and 5, an interval adjustment part 22 shown in FIGS. 2, 3B and 6, a fixing part 23 shown in FIGS. 2, 3A, 3B and 6, and so on.

The contact plate 13 shown in FIGS. 1A to 6 is a member configured to slide along the trolley wire 1 a. As shown in FIGS. 1A and 1B, the contact plate 13 is a plate-shaped member formed of a metal or carbon and elongated in a direction perpendicular to the traveling direction of the vehicle 2, and a component constituting a portion of the contact plate assembly 12. A central section of the contact plate 13 has a function of a main contact plate mainly sliding along the trolley wire 1a when the vehicle 2 travels on a main line, and both end sections of the contact plate 13 have a function of an auxiliary contact plate having a frequency of sliding along the trolley wire 1a smaller than that of the main contact plate. Since a large current flows through the contact plate 13 while moving (sliding) and contacting the trolley wire 1a, a certain mechanical strength, conductivity, wear resistance, and so on, are needed. As shown in FIGS. 1B to 3B, the contact plate 13 is a contact plate divided into a plurality of pieces in the longitudinal direction. As shown in FIGS. 3A and 3B, the contact plate 13 includes a total of twelve contact plate pieces 13a attached to the central section of the collector shoe 9, and a total of two contact plate pieces 13b attached to both end sections of the collector shoe 9.

The contact plate piece 13a shown in FIGS. 1B to 5 is a member constituting a major part of the contact plate 13. As shown in FIGS. 2, 3A and 3B, the contact plate piece 13a is a contact plate small piece disposed in the longitudinal direction of the collector shoe 9 in a row at predetermined intervals (gaps) $A_1$ to prevent interference of the neighboring contact plate pieces 12a. The contact plate pieces 13a have a predetermined width (for example, 52 mm), length (for example, 74 mm) and thickness (for example, 10 mm). For example, as shown in FIG. 3A, the contact plate piece 13a has a thin plate-shaped member having an external shape of a parallelogram. The contact plate piece 13a is cut in a linear shape, both side portions of which are inclined at an inclination angle 0 of about 15° with respect to the traveling direction (a direction perpendicular to the longitudinal direction of the contact plate 13) $L_o$ of the contact plate 13. In addition, an interval $A_1$ of 2 mm is formed between the contact plate piece 13a and the neighboring contact plate pieces 13a. For example, two pieces of the contact plate pieces 13a, which function as auxiliary contact plates, disposed at both end sections are formed of aluminum, and ten pieces, which functions as main contact plates, disposed at a central section (for example, a range of 540 mm) are formed of an iron-based sintered alloy. In addition, when the two pieces of both of the end sections are largely worn, the two pieces of both of the end sections may also be replaced with pieces formed of an iron-based sintered alloy. The contact plate piece 13a comes in contact with the trolley wire 1a to independently move in the upward and downward direction according to variation in contact force C applied between the trolley wire 1a and the contact plate piece 13a and displacement in the upward and downward direction of the trolley wire I a. As shown in FIG. 4, the contact plate piece 13a includes a female screw section 13c passing through the contact plate piece 13 a.

The contact plate piece 13b shown in FIGS. 1B to 3B and 6 is a member constituting an auxiliary portion of the contact plate 13. The contact plate piece 13b has a function of an auxiliary contact plate similar to the two contact plate pieces 13a of both of the end sections. For example, as shown in FIG. 3A, the contact plate piece 13b is a thin plate-shaped member having a tip section divided into two pieces, and has a predetermined width (for example, 52 mm), length (for example, 175 mm) and thickness (for example, 8 mm). The contact plate piece 13b is cut in a linear shape in which a side portion thereof near the contact plate piece 13a is inclined at an inclination angle 0 of about 15° with respect to the traveling direction Lo of the contact plate 13. In addition, in order to prevent interference between the neighboring contact plate pieces 13a and 13b, an interval $A_1$ of 2 mm is formed between the contact plate piece 13b and the neighboring contact plate pieces 13a. For example, since the contact plate piece 13b is a thin plate-shaped member formed of aluminum and a frequency of contacting with the trolley wire 1a is lower than the contact plate piece 13a of the central section, a light weight is more important than wear resistance. As shown in FIG. 6, the contact plate piece 13b includes a female screw section 13d passing through the contact plate piece 13b.

Figure 3A:
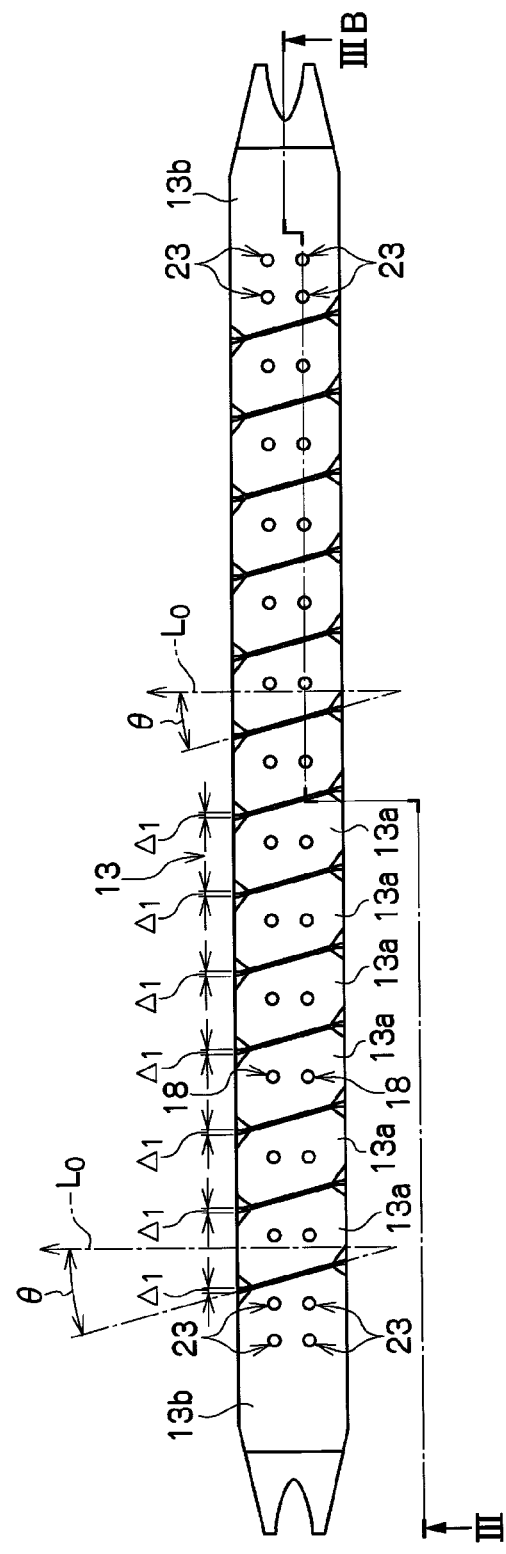
FIG. 3A is an outline plan view of the contact plate assembly assembled by the assembly jig of the contact plate assembly according to the embodiment of the present invention.
Figure 3B:
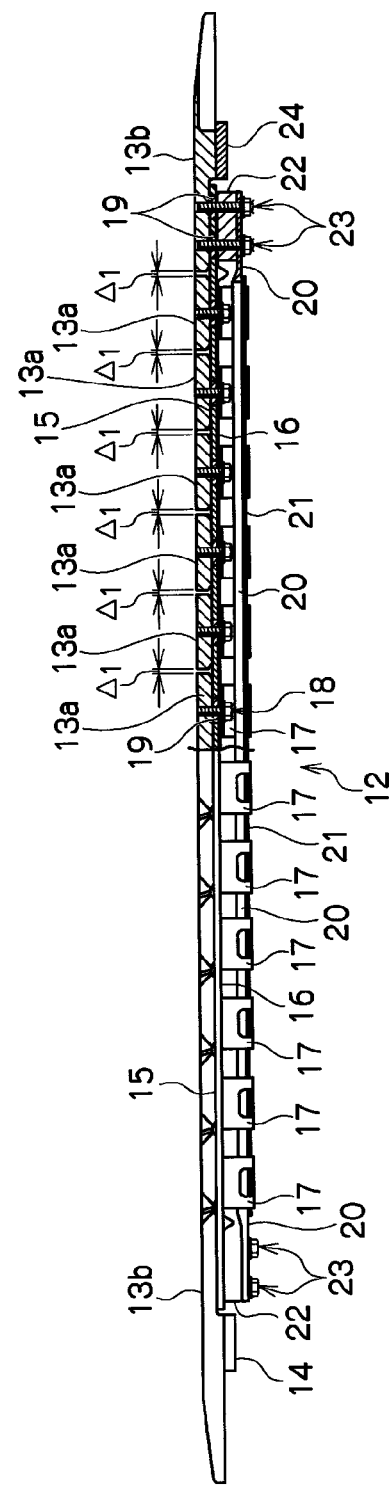
FIG. 3B is a cross-sectional view taken along line III-IIIB of FIG. 3A.

The mounting part 14 shown in FIGS. 2, 3A and 3B is a member configured to detachably mount the contact plate assembly 12 on the shoe body frame 24 of the collector shoe 9. The mounting part 14 is a thin plate-shaped member having a rectangular external shape, and is detachably fixed to a lower surface of the contact plate piece 13b by a fixing member such as a bolt (not shown) or the like. As shown in FIG. 2, the mounting part 14 is a convex-shaped fitting part that can be fitted into the mounting part 24a of the shoe body frame 24 side, and is disposed at both end sections of the contact plate 13 so as to protrude from the lower surface of the contact plate 13. A height of the mounting part 14 is formed to be slightly smaller than a sum of thicknesses of the resilient part 15 and the conductive part 16 such that the interval adjustment part 22 does not interfere with the mounting part 14 when the interval adjustment part 22 is inserted between the stopper part 20 and the conductive part 16 in the lateral direction. As shown in FIGS. 3A and 3B, the mounting part 14 is disposed at both end sections of the contact plate 13, and also has a function as a benchmark when the resilient part 15, the conductive part 16 and the interval adjustment part 22 are positioned at the contact plate piece 13b.

The resilient part 15 shown in FIGS. 2 to 6 is a member resiliently deformed according to movement of the contact plate 13 in the upward and downward direction. The resilient part 15 is a long plate-shaped flexible member (a seat-shaped member) having arc resistance and non-conductivity. Lower surfaces of the contact plate pieces 13a and 13b come in contact with an upper surface of the resilient part 15. For example, the resilient part 15 is a plastic seat having a three-layered sandwich structure in which silicon rubber is adhered to both surfaces of a glass cross fiber, or a plastic seat formed of a single layer high tear strength silicon rubber with no crack. High tear strength silicon rubber capable of preventing generation of a crack due to insufficient strength, preventing invasion of rainwater generated by exfoliation of a bonding surface, and capable of omitting reinforcement by a glass cross fiber may be used as the resilient part 15. For example, while a glass cross fiber-embedded plastic seat has a tensile strength of 9.4 (MPa), a hardness of 55 (Hsc), an elongation of 3.2(%) and an internal tearing strength of 21.4 (kN/m), a plastic seat formed of high tear strength silicon rubber has a tensile strength of 11.4 (MPa), a hardness of 50 (Hsc), an elongation of 680(%) and an internal tearing strength of 33.0 (kN/m), which has sufficient strength in comparison with the glass cross fiber-embedded plastic seat. When the contact plate piece 13a moves in the upward and downward directions according to displacement of the trolley wire 1 a, the resilient part 15 is bent according to upward and downward movement of the contact plate piece 13a. As shown in FIGS. 4 and 6, the resilient part 15 has through-holes 15a disposed in a longitudinal direction and a width direction of the resilient part 15 at predetermined intervals.

The conductive part 16 shown in FIGS. 2 to 6 is a member configured to secure a current path. The conductive part 16 is a conductive member formed by arranging a plurality of (for example, one set of 5) copper plates having flexibility, which can be resiliently deformed with the resilient part 15. As shown in FIGS. 4 to 6, a width of the conductive part 16 is formed to be smaller than that of the resilient part 15. The conductive part 16 has a through-hole 16a passing through the conductive part 16 into which a fixing bolt 18a shown in FIG. 4 is inserted, and a through-hole 16b passing through the conductive part 16 into which a fixing bolt 23a shown in FIG. 6 is inserted. As shown in FIGS. 4 to 6, a lower surface of the resilient part 15 comes in contact with an upper surface of the conductive part 16, and upper surfaces of the movable guide part 17, the interval adjustment part 22 and the resilient support part 26 come in contact with a lower surface of the conductive part 16.

The movable guide part 17 shown in FIGS. 2 to 4 is a member configured to move with the contact plate piece 13a. As shown in FIG. 4, the movable guide part 17 is a hollow frame member having a square-shaped cross section. The movable guide part 17 is integrated with the contact plate piece 13a, the resilient part 15 and the conductive part 16 to be slidable in the upward and downward directions. As shown in FIGS. 2, 3A and 3B, the plurality of movable guide parts 17 are disposed in the longitudinal direction of the shoe body frame 24 at predetermined intervals. As shown in FIG. 4, the movable guide part 17 includes a through-hole 17a passing through an upper portion of the movable guide part 17, a sliding surface 17b sliding along a sliding surface 25b of the fixing guide part 25, a through-hole 17c passing through the movable guide part 17 to insert the fixing bolt 18a thereinto, and so on. The movable guide part 17 slides in the upward and downward directions according to upward and downward movement of the contact plate piece 13a when the contact plate piece 13a moves in the upward and downward directions according to displacement of the trolley wire 1a.

The fixing part 18 shown in FIGS. 3A, 3B and 4 is a member configured to fix the contact plate piece 13a and the movable guide part 17. As shown in FIG. 4, the fixing part 18 detachably fixes the movable guide part 17 to the contact plate piece 13a so as to sandwich the resilient part 15 and the conductive part 16 between the lower surface of the contact plate piece 13a and the upper surface of the movable guide part 17. The fixing part 18 includes a fixing bolt (a contact plate piece attachment bolt) 18a, a tip section of which passes through the through-holes 16a, 17a and 19a to be threaded into the female screw section 13c of the contact plate piece 13a, and a metal washer 18b sandwiched between the fixing bolt 18a and the movable guide part 17.

The interval adjustment part 19 shown in FIGS. 3A, 3B, 4 and 6 is a member configured to adjust an interval between the contact plate pieces 13a and 13b and the conductive part 16. As shown in FIGS. 4 and 6, the interval adjustment part 19 is an annular collar or the like fitted into the through-hole 15a of the resilient part 15, and functions as a spacer configured to fill a gap between the contact plate piece 13a and the conductive part 16 to electrically connect them. The interval adjustment part 19 has a through-hole 19a through which the fixing bolts 18a and 23a pass. As shown in FIG. 4, the interval adjustment part 19 is sandwiched between the contact plate pieces 13a and 13b and the conductive part 16 to constantly adjust an interval between the contact plate pieces 13a and 13b and the conductive part 16.

The stopper part 20 shown in FIGS. 2 to 6 is a member configured to restrict a movable range of the movable guide part 17 within a predetermined range. As shown in FIG. 4, the stopper part 20 is a thin plate-shaped member having a substantially W-shaped cross section, and as shown in FIGS. 2, 3A and 3B, passes through the inside of the movable guide part 17. As shown in FIG. 2, both end sections of the stopper part 20 are fixed with respect to an inner bottom surface of the shoe body frame 24 at a predetermined height. As shown in FIG. 4, in the stopper part 20, as a lower bottom surface of the stopper part 20 comes in contact with a lower upper surface of the movable guide part 17, an upper limit of a movable range (a movement amount in the upward and downward directions) of the movable guide part 17 is defined, and as an upper end surface of the stopper part 20 comes in contact with an upper lower surface of the movable guide part 17, a lower limit of the movable range of the movable guide part 17 is defined. The stopper part 20 prevents the contact plate piece 13a, the resilient part 15 and the movable guide part 17 from falling of from the shoe body frame 24 as the movable guide part 17 moves upward with the contact plate piece 13a, the resilient part 15, and so on, by a resilient force of the resilient support part 26 shown in FIG. 2. As shown in FIG. 5, the stopper part 20 includes a through-hole 20a passing through the stopper part 20 to allow insertion of the resilient support part 26, a through-hole 20b passing through the stopper part 20 to allow insertion of the fixing bolt 18a as shown in FIG. 4, and a through-hole 20c passing through the stopper part 20 to allow insertion of the fixing bolt 23a as shown in FIG. 6.

The shock absorbing part 21 shown in FIGS. 4 and 5 is a member configured to attenuate an impact generated when the lower bottom surface of the stopper part 20 collides with the lower upper surface of the movable guide part 17. For example, the shock absorbing part 21 is a thin plate-shaped member formed of rubber. As shown in FIGS. 3A and 3B, the shock absorbing part 21 is fixed to the lower bottom surface of the stopper part 20 in the longitudinal direction of the stopper part 20 by an adhesive agent. As shown in FIG. 5, the shock absorbing part 21 includes a through-hole 21a passing through the shock absorbing part 21 to allow insertion of the resilient support part 26, and a through-hole 21b passing through the shock absorbing part 21 to allow insertion of the fixing bolt 18a as shown in FIG. 4.

The interval adjustment part 22 shown in FIGS. 2, 313 and 6 is a member configured to adjust an interval between the conductive part 16 and the stopper part 20. The interval adjustment part 22 is a thick plate-shaped member sandwiched between the lower surface of the conductive part 16 and the upper surface of the stopper part 20. The interval adjustment part 22 has a function of a spacer configured to fill a gap between both end sections of the conductive part 16 and both end sections of the stopper part 20 as shown in FIG. 3B. As shown in FIG. 6, the interval adjustment part 22 has a through-hole 22a through which the fixing bolt 23a passes, and is sandwiched between the conductive part 16 and the stopper part 20 to constantly adjust an interval between the conductive part 16 and the stopper part 20.

The fixing part 23 shown in FIGS. 2, 3A, 313 and 6 is a member configured to fix the contact plate piece 13b and the stopper part 20. As shown in FIGS. 2 and 6, the fixing part 23 detachably fixes the stopper part 20 to the contact plate piece 13b such that the resilient part 15, the conductive part 16 and the interval adjustment part 22 are sandwiched between the lower surface of the contact plate piece 13b and the upper surface of the stopper part 20. As shown in FIG. 6, the fixing part 23 includes the fixing bolt (a contact plate piece attachment bolt) 23a having a tip section passing through the through-holes 16b, 19a, 20c and 22a to be threaded into the female screw section 13d of the contact plate piece 13b, and a metal washer 23b sandwiched between the fixing bolt 23a and the stopper part 20.

The shoe body frame 24 shown in FIGS. 2 and 4 to 6 is a member constituting main body portion of the collector shoe 9. As shown in FIGS. 4 to 6, the shoe body frame 24 is a groove type frame member having a U-shaped cross section. An aperture part is formed at an upper portion of the shoe body frame 24, and the movable guide part 17, the stopper part 20, the fixing guide part 25, the resilient support part 26, and so on, are accommodated in the shoe body frame 24. The rectifying part 10 is attached to outer side surfaces (a front surface and a rear surface) of the shoe body frame 24, and the shoe support part 8 shown in FIGS. 1A and 1B is attached to the lower surface of the shoe body frame 24. As shown in FIG. 2, thick plate-shaped portions having a predetermined length with no groove are formed at both end sections of the shoe body frame 24. The lower surface of the contact plate piece 13b is attached to the upper surface of the thick plate-shaped portion. The shoe body frame 24 includes a mounting part 24a configured to detachably mount the mounting part 14 of the contact plate assembly 12 side. The mounting part 24a is a concave-shaped fitting part that can be fitted onto the mounting part 14.

The fixing guide parts 25 shown in FIGS. 4 and 5 are members configured to movably guide the movable guide part 17. The fixing guide parts 25 are long plate-shaped members attached to both side surfaces inside the shoe body frame 24 to oppose each other. As shown in FIG. 4, the fixing guide part 25 includes the sliding surface 25b configured to slide along the sliding surface 17b of the movable guide part 17 side. The fixing guide part 25 has a function of a stopper part configured to allow movement in the vertical direction of the movable guide part 17 and restrict movement in the horizontal direction of the movable guide part 17. The fixing guide part 25 movably guides the movable guide part 17 such that the movable guide part 17 can move in the upward and downward directions according to displacement of the trolley wire 1 a.

The resilient support part 26 shown in FIGS. 2 and 5 is a member configured to resiliently support the contact plate piece 13a. The resilient support part 26 is a resilient body (a biasing member) such as a compression coil spring or the like, which receives compression. The same number of resilient support parts 26 as the contact plate pieces 13a are disposed between the neighboring movable guide parts 17 to correspond to the contact plate pieces 13a as shown in FIGS. 2 and 5. As shown in FIG. 5, an upper end section of the resilient support part 26 passes through the through-hole 20a of the stopper part 20 and the through-hole 21a of the shock absorbing part 21 to come in contact with the lower surface of the conductive part 16, and a lower end section of the resilient support part 26 is attached to a bottom upper surface of the shoe body frame 24. As shown in FIGS. 2 and 5, the resilient support part 26 supports the contact plate piece 13a via the resilient part 15 and the conductive part 16. The resilient support part 26 elongates or contracts in response to the contact force C applied between the contact plate piece 13a and the trolley wire 1a shown in FIGS. I A and 1B.

The fixing part 27 shown in FIG. 5 is a member configured to fix the resilient support part 26 to the shoe body frame 24. The fixing part 27 includes a holding plate 27a attached to a bottom surface inside the shoe body frame 24 and configured to hold the lower end section of the resilient support part 26, a presser plate 27b configured to sandwich the lower end section of the resilient support part 26 between the holding plate 27a and the presser plate 27b and press the lower end section of the resilient support part 26, a fixing bolt 27c configured to fix the holding plate 27a and the presser plate 27b to the shoe body frame 24, a metal washer 27d sandwiched between the fixing bolt 27c and the presser plate 27b, and so on.

Next, an operation of the contact plate assembly assembled by the assembly jig of the contact plate assembly according to the embodiment of the present invention will be described.

As shown in FIGS. 1A and 1B, when the vehicle 2 travels in the traveling direction $L_0$, the contact plate 13 moves with respect to the trolley wire 1a while contacting the trolley wire I a, and the trolley wire 1a is lifted upward according to progress of the contact plate 13. Since the trolley wire 1a is supported at support points by overhead line metal fittings at predetermined intervals in the longitudinal direction, the vicinity of the support point of the trolley wire 1 a becomes a hard spot. For this reason, while an uplift amount that the contact plate 13 displaces the trolley wire 1a in an upward direction is small in the vicinity of the support point, the uplift amount is increased in the vicinity of a center between the support points of the trolley wire 1a. As a result, the contact plate 13 repeats upward and downward wave motions according to traveling of the vehicle 2, and a separation line along which the contact plate 13 is separated from the trolley wire 1a is generated. The contact plate body according to the present invention is different from the contact plate body of the related art, and the contact plate 13 is divided by the number of contact plate pieces 13a and 13b. For this reason, in the contact plate body according to the embodiment of the present invention, the weight of each of the contact plate pieces 13a is reduced. In addition, the contact plate piece 13a is flexibly supported by the resilient part 15 and the conductive part 16, and each of the contact plate pieces 13a is supported by the independent resilient support part 26. For this reason, when the contact force C is applied to each of the contact plate pieces 13a, the resilient part 15 and the conductive part 16 are bent against the resilient force of the resilient support part 26, and the contact plate piece 13a to which the contact force C is applied is displaced. Further, the contact plate piece 13a and both neighboring contact plate pieces 13a are also displaced accordingly. As a result, the following performance of the contact plate piece 13a to the trolley wire 1a is improved to reduce the separation line and improve the current collection performance. In addition, damage to the contact plate 13 by the separation line arc generated between the contact plate piece 13a and the trolley wire 1a is reduced.

Figure 7:
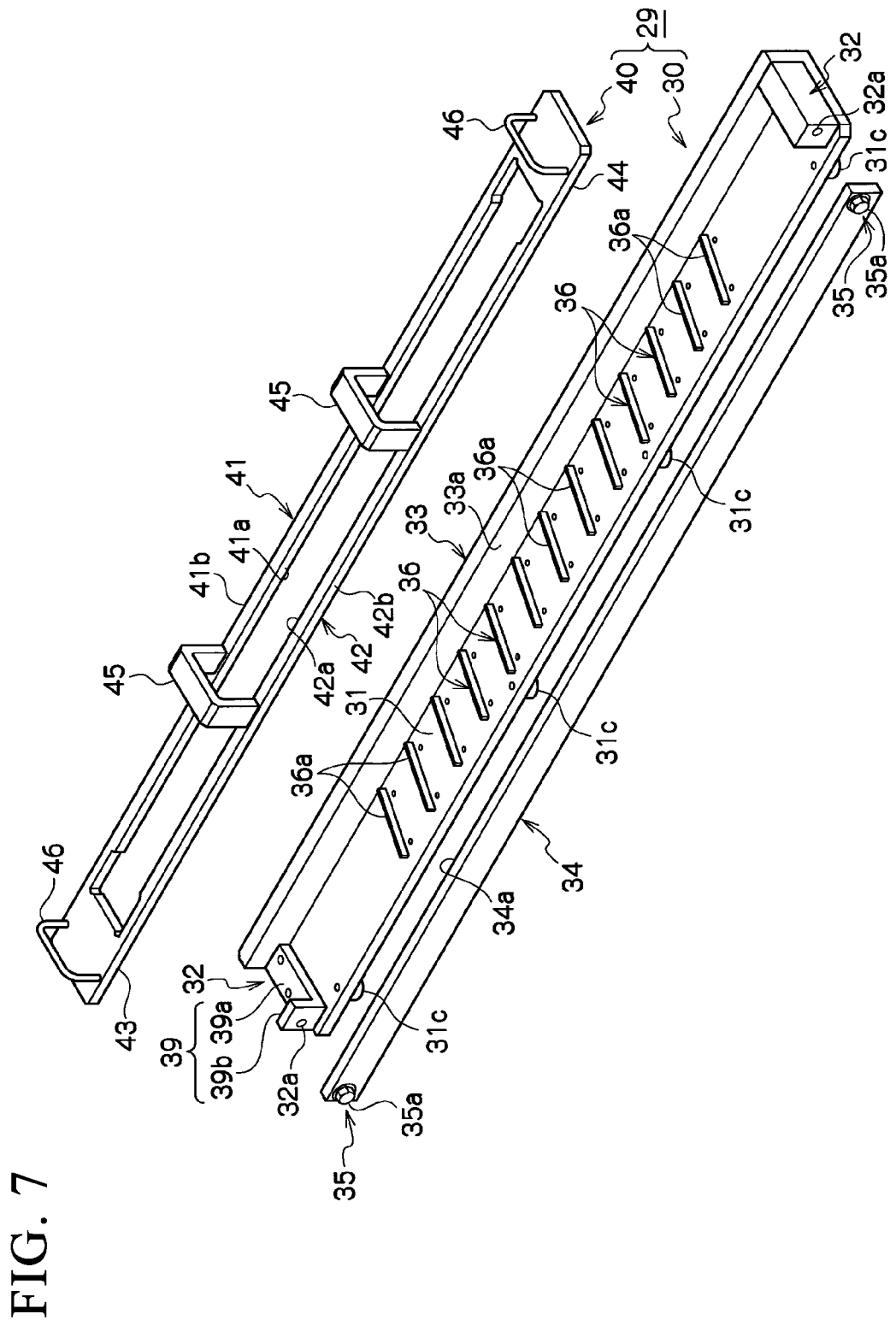
FIG. 7 is a perspective view of the assembly jig of the contact plate assembly according to the embodiment of the present invention.

An assembly jig 29 shown in FIG. 7 is a jig used when the contact plate assembly 12 is assembled. The assembly jig 29 accurately and linearly aligns the contact plate pieces 13a and 13b at predetermined intervals $A_1$, and the sliding surfaces 17b of the movable guide parts 17 are accurately arranged on the same plane (a flush surface). The contact plate assembly 12 may be built at the assembly jig 29 in a reversed state in which the contact plate assembly 12 is in an upside down posture reversed from a conventional use posture as shown in FIGS. 1A to 6. The assembly jig 29 includes a contact plate assembly jig 30 and a movable guide assembly jig 40. Then, as the contact plate assembly jig 30 is detachably assembled to the movable guide assembly jig 40, an assembling operation is assisted with when an operator assembles the contact plate assembly 12, and assembly of the contact plate assembly 12 becomes easy. A dimension of the assembly jig 29 is set such that accurate assembly becomes possible when dimensions of the components are in a tolerance and the contact plate assembly 12 is assembled at a required assembling precision in consideration of a tolerance of the components of the contact plate assembly 12.

The contact plate assembly jig 30 shown in FIGS. 7, 8A, 8B and 8C is a jig configured to linearly align the plurality of contact plate pieces 13a and 13b at the predetermined intervals A. The contact plate assembly jig 30 has a function of linearly aligning the contact plate pieces 13a and 13b at the predetermined intervals $A_1$, a function of aligning surfaces of the contact plate pieces 13a and 13b in contact with the trolley wire 1a on the same plane (a flush surface), a function of aligning the contact plate pieces 13a and 13b such that the entire length of the contact plate 13 is a prescribed length, a function of positioning the mounting part 14 at a position at which the mounting part 14 of the contact plate assembly 12 side is fitted to the mounting part 24a of the shoe body frame 24, a function of positioning the stopper part 20 such that a center of the movable guide part 17 coincides with a center of the stopper part 20, and so on. The contact plate assembly jig 30 includes a loading part 31, a contact plate piece positioning part 32, contact plate piece aligning parts 33 and 34, a fixing part 35 and an interval holding part 36 shown in FIGS. 7, 8A, 8B and 8C, an interval adjustment part 37 shown in FIGS. 8A, 8B and 8C, a fixing part 38 and a stopper guide part 39 shown in FIGS. 7, 8A, 8B and 8C, and so on.

Figure 8B:
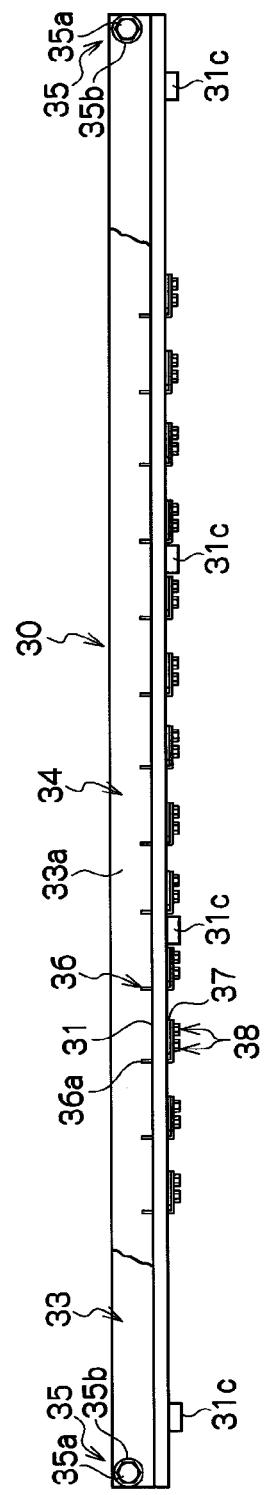
FIG. 8B is an outline side view of the contact plate assembly jig of the assembly jig of the contact plate assembly according to the embodiment of the present invention, a portion of which is broken.
Figure 8C:
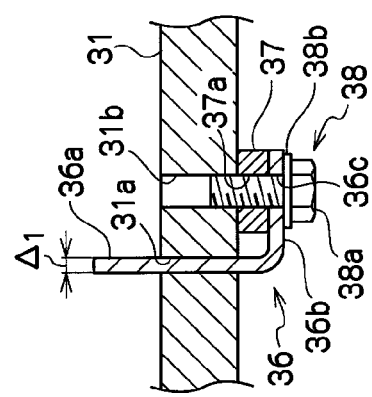
FIG. 8C is a cross-sectional view taken along line VIII-VIIC of FIG. 8A.
Figure 9:
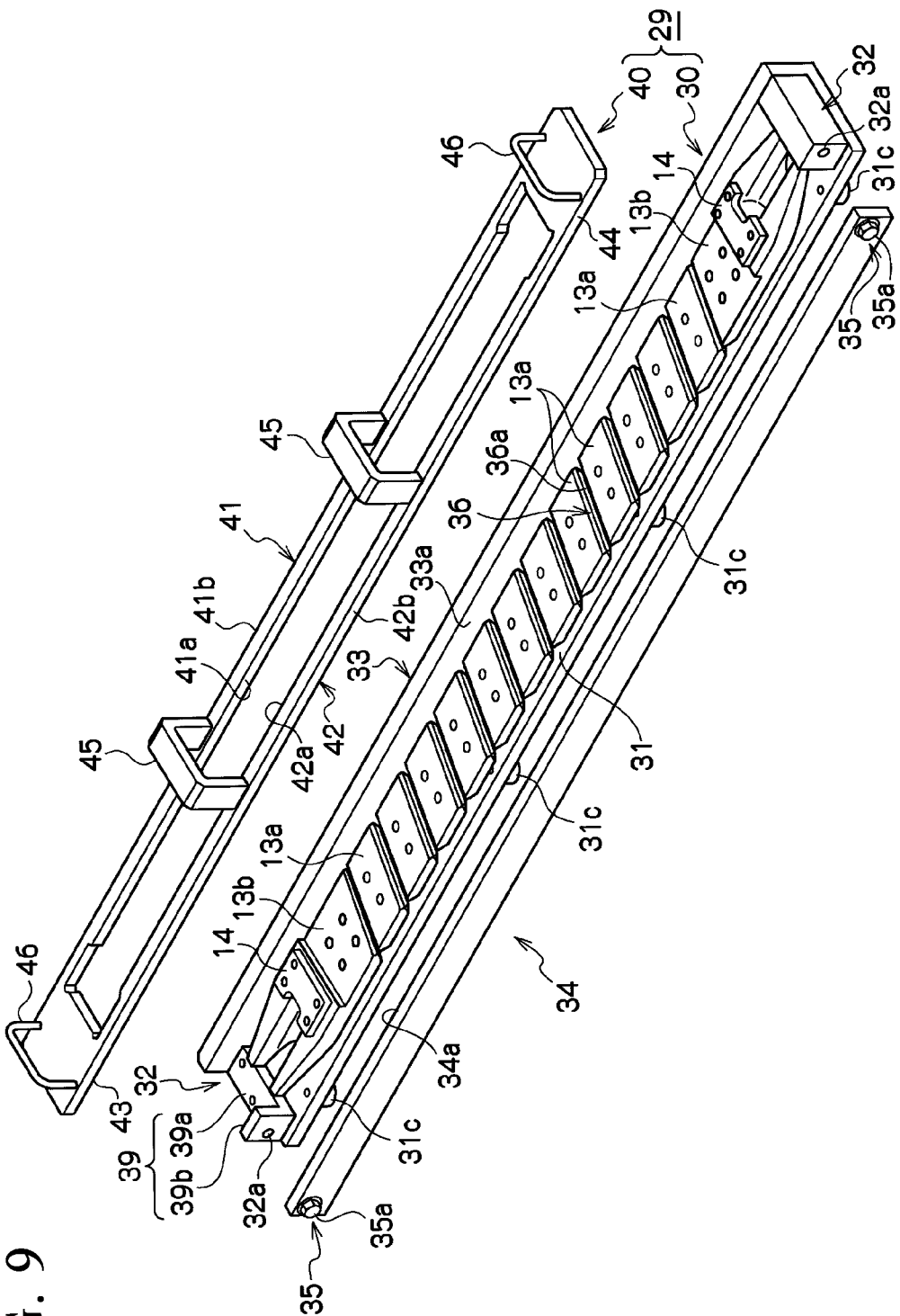
FIG. 9 is a perspective view showing a state in which a contact plate piece is loaded on a loading part of the contact plate assembly jig in the assembly jig of the contact plate assembly according to the embodiment of the present invention.

The loading part 31 shown in FIGS. 7 to 10 is a member configured to arrange and load the plurality of contact plate pieces 13a. The loading part 31 is a long plate-shaped member formed of a metal and having a weight such that the loading part 31 cannot be easily moved with the assembly jig 29 upon assembly work, and is a thick plate-shaped base part having a rectangular external shape. The loading part 31 supports the surfaces of the contact plate pieces 13a and 13b in contact with the trolley wire 1 a shown in FIGS. 1A and 1B. Further, the loading part 31 aligns the surfaces of the contact plate pieces 13a and 13b on the same plane (a flush surface) as shown in FIG. 9. A length of the loading part 31 is slightly larger than the entire length of the contact plate 13, and a width of the loading part 31 is slightly larger than that of the contact plate 13. As shown in FIG. 8C, the loading part 31 includes a long hole-shaped through-hole 31a passing through the loading part 31, a female screw section 31b passing through the loading part 31, a leg section 31c configured to form a predetermined gap between an upper surface of a working table and a lower surface of the loading part 31 when the contact plate assembly jig 30 is placed on the working table or the like as shown in FIG. 8B.

The contact plate piece positioning part 32 shown in FIG. 9 is a member configured to position the contact plate pieces 13b disposed at both ends of the contact plate pieces 13a and 13b on the loading part 31 at predetermined positions such that the entire length of the contact plate 13 becomes a predetermined length. For example, the contact plate piece positioning part 32 is detachably and exchangeably fixed to both end sections of the loading part 31 by a fixing member such as a bolt (not shown) such that a plurality of kinds of contact plate assemblies 12 having different entire lengths of contact plates 13 can be assembled. The contact plate piece positioning part 32 positions the mounting part 14 of the contact plate assembly 12 side at a predetermined position such that the mounting part 14 of the contact plate assembly 12 side is detachably mounted on the mounting part 24a of the shoe body frame 24 side. For example, as shown in FIG. 2, the contact plate piece positioning part 32 positions the contact plate piece 13b at a predetermined position and also positions the mounting part 14 at a predetermined position as shown in FIG. 9 such that the mounting part 14 of the contact plate assembly 12 side is accurately fitted to the mounting part 24a of the shoe body frame 24 side. The contact plate piece positioning part 32 is a block having a length substantially equal to width of the contact plate 13 and an external shape of a thick plate. The contact plate piece positioning parts 32 are disposed at both end sections of the loading part 31 at the same interval as the entire length of the contact plate 13. The contact plate piece positioning part 32 comes in contact with the tip section of the contact plate piece 13b, when the contact plate pieces 13a and 13b are loaded on the loading part 31, to adjust the contact plate 13 such that the entire length of the contact plate 13 becomes a predetermined length and also adjust the mounting part 14 fixed to the contact plate piece 13b to an accurate position. The contact plate piece positioning part 32 includes a female screw section 32a formed at one end section thereof.

Figure 10:
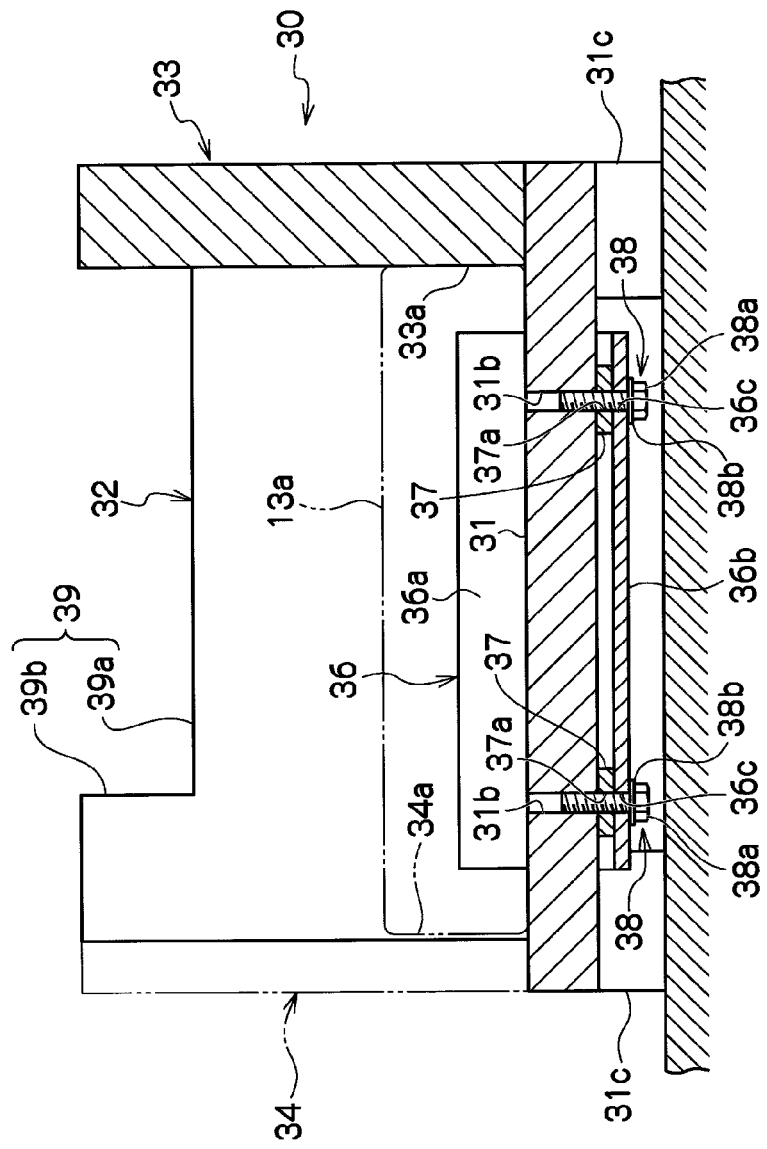
FIG. 10 is a cross-sectional view taken along line X-X of FIG. 8A.

The contact plate piece aligning parts 33 and 34 shown in FIGS. 7 to 10 are members configured to align the plurality of contact plate pieces 13a and 13b such that the plurality of contact plate pieces 13a and 13b are arranged on the loading part 31 in a predetermined direction. As shown in FIGS. 9 and 10, the contact plate piece aligning parts 33 and 34 come in contact with the end surfaces of the plurality of contact plate pieces 13a and 13b to align the plurality of contact plate pieces 13a and 13b in the predetermined direction. The contact plate piece aligning parts 33 and 34 are long plate-shaped members having substantially the same shape and substantially the same height as the contact plate assembly 12. The contact plate piece aligning part 33 is a fixing wall section configured to fix one end sections of the contact plate pieces 13a and 13b. The contact plate piece aligning part 34 is a detachable (separable) cover part configured to close the other end sections of the contact plate pieces 13a and 13b. The contact plate piece aligning parts 33 and 34 position both end surfaces of the contact plate pieces 13a and 13b such that the contact plate pieces 13a and 13b are arranged on the loading part 31 in a row. The contact plate piece aligning parts 33 and 34 include aligning surfaces 33a and 34a configured to come in contact with the end surfaces of the plurality of contact plate pieces 13a and 13b to align the end surfaces of the plurality of contact plate pieces 13a and 13b. The aligning surface 33a is a flat surface configured to come in contact with one end surfaces of the contact plate pieces 13a and 13b such that the one end surfaces of the contact plate pieces 13a and 13b are linearly aligned. The aligning surface 34a is a flat surface configured to come in contact with the other end surfaces of the contact plate pieces 13a and 13b such that the other end surfaces of the contact plate pieces 13a and 13b are linearly aligned. The contact plate piece aligning part 33 is fixed to one edge section of the loading part 31 by a fixing member such as a bolt or the like (not shown). The contact plate piece aligning part 34 is detachably fixed to one edge section of the loading part 31 such that the contact plate assembly 12 after completion of assembly can be easily removed from the contact plate assembly jig 30.

The fixing part 35 shown in FIGS. 7 to 9 is a member configured to fix the contact plate piece aligning part 34 to the loading part 31. The fixing part 35 detachably fixes the contact plate piece aligning part 34 to the contact plate piece positioning part 32 so as to sandwich the contact plate pieces 13a and 13b between the contact plate piece aligning part 33 and the contact plate piece aligning part 34. The fixing part 35 includes a fixing bolt 35a threaded into the female screw section 32a of the contact plate piece positioning part 32 shown in FIGS. 7 and 9, a metal washer 35b sandwiched between the fixing bolt 35a and the contact plate piece positioning part 32, and so on.

The interval holding part 36 shown in FIGS. 7 to 10 is a member configured to hold the neighboring contact plate pieces 13a and 13b at the predetermined interval $A_1$ such that the plurality of contact plate pieces 13a and 13b are arranged on the loading part 31 at the predetermined interval A1. As shown in FIG. 8C, the interval holding part 36 is a thin plate-shaped member having a substantially L-shaped cross-section. As shown in FIG. 9, the interval holding part 36 is a contact plate interval adjustment plate configured to adjust an interval of the contact plate pieces 13a and 13b to the predetermined interval $A_I$ by being sandwiched between the neighboring contact plate pieces 13*a* and 13*b*. For example, the interval holding part 36 is constituted by a separate part from the loading part 31 and configured to be detachably installed at the loading part 31 such that the interval holding part 36 can be easily replaced with a new one upon damage thereto. A thickness of the interval holding part 36 is substantially equal to the interval $A_1$ of the neighboring contact plate pieces 13*a* and 13*b* shown in FIGS. 2, 3A and 3B. As shown in FIG. 8C, the interval holding part 36 includes protrusion sections 36*a*, a curved section 36*b*, and so on. As shown in FIGS. 7 and 8A and 8B, the protrusion sections 36*a* are portions protruding upward from the loading part 31 at a predetermined interval in a longitudinal direction of the loading part 31. The protrusion section 36*a* passes through a through-hole 31*a* of the loading part 31 as shown in FIG. 8C. The protrusion section 36*a* protrudes from the upper surface of the loading part 31 to be slightly lower than the thickness of the contact plate pieces 13*a* and 13*b* as shown in FIG. 10. As shown in FIG. 8C, the curved section 36*b* is a portion protruding from the lower surface of the loading part 31 and elongated parallel to the loading part 31. The curved section 36*b* has a through-hole 36*c* passing through the curved section 36*b*. As shown in FIG. 8A, the interval holding part 36 is obliquely disposed on the loading part 31 at an inclination angle 0 of about 15° with respect to the traveling direction Lo of the contact plate 13, similar to the inclined surfaces of the contact plate pieces 13*a* and 13*b*. The interval holding parts 36 are disposed in the longitudinal direction of the loading part 31 at substantially the same interval as the width of the contact plate piece 13*a* in a row.

The interval adjustment part 37 shown in FIGS. 8B, 8C and 10 is a member configured to adjust an interval between the loading part 31 and the interval holding part 36. The interval adjustment part 37 is a thin plate-shaped member fitted between the lower surface of the loading part 31 and the upper surface of the curved section 36*b*, and a spacer configured to adjust a protrusion amount of the protrusion section 36*a* of the interval holding part 36. For example, a plurality of kinds of interval adjustment parts 37 having different thicknesses are present, and the interval adjustment part 37 having an appropriate thickness is selected and used when and the contact plate pieces 13*a* and 13*b* having different thicknesses are assembled. As shown in FIG. 8C, the interval adjustment part 37 includes a through-hole 37*a* through which a fixing bolt 38*a* passes.

The fixing part 38 shown in FIGS. 8C and 10 is a member configured to fix the interval holding part 36 to the loading part 31. The fixing part 38 detachably fixes the interval holding part 36 to the loading part 31 such that the interval adjustment part 37 is sandwiched between the loading part 31 and the interval holding part 36. The fixing part 38 includes the fixing bolt 38*a* inserted into the through-hole 36*c* of the curved section 36*b* of the interval holding part 36 and the through-hole 37*a* of the interval adjustment part 37 to be threaded into the female screw section 32*a* of the loading part 31, and a metal washer 38*b* sandwiched between the fixing bolt 38*a* and the curved section 36*b*.

Figure 13:
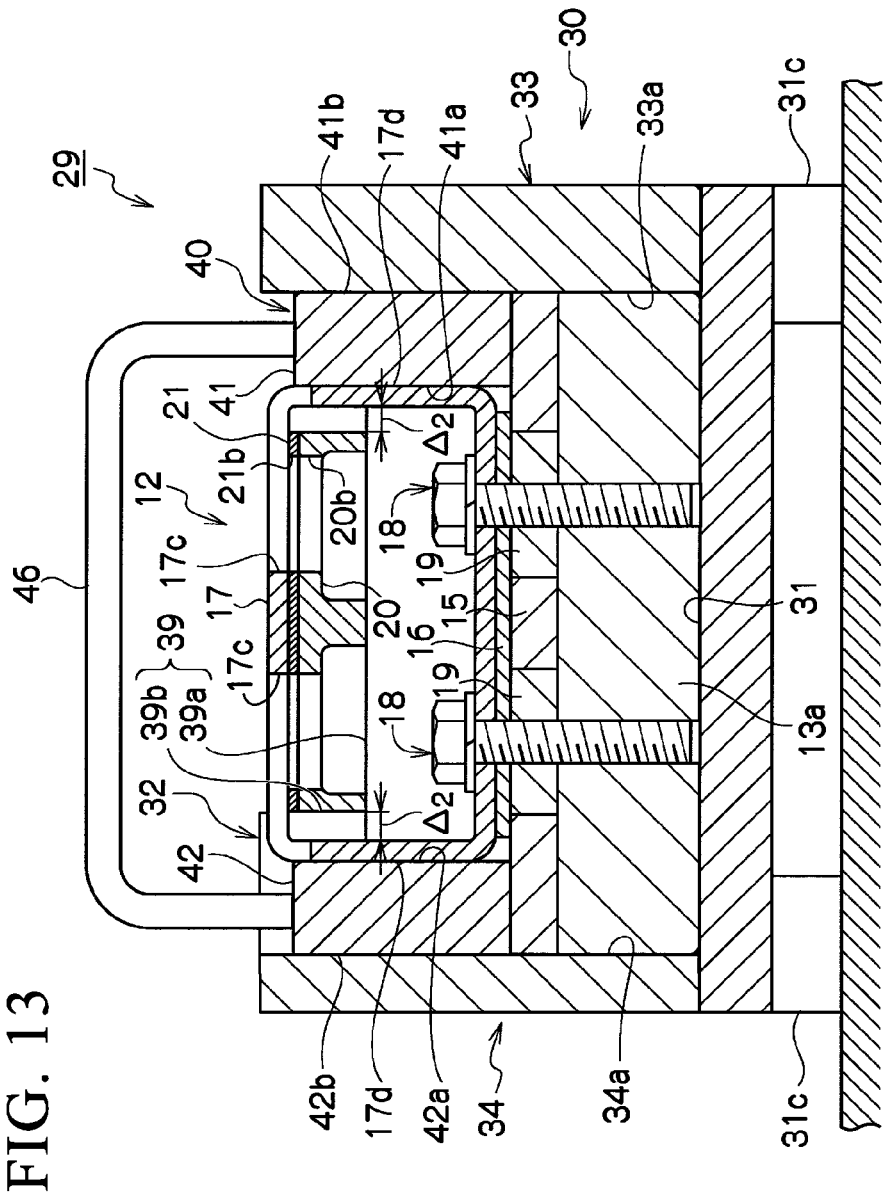
FIG. 13 is a cross-sectional view showing a state in which the movable guide assembly jig of the assembly jig of the contact plate assembly according to the embodiment of the present invention is mounted on the contact plate assembly jig.
Figure 14:
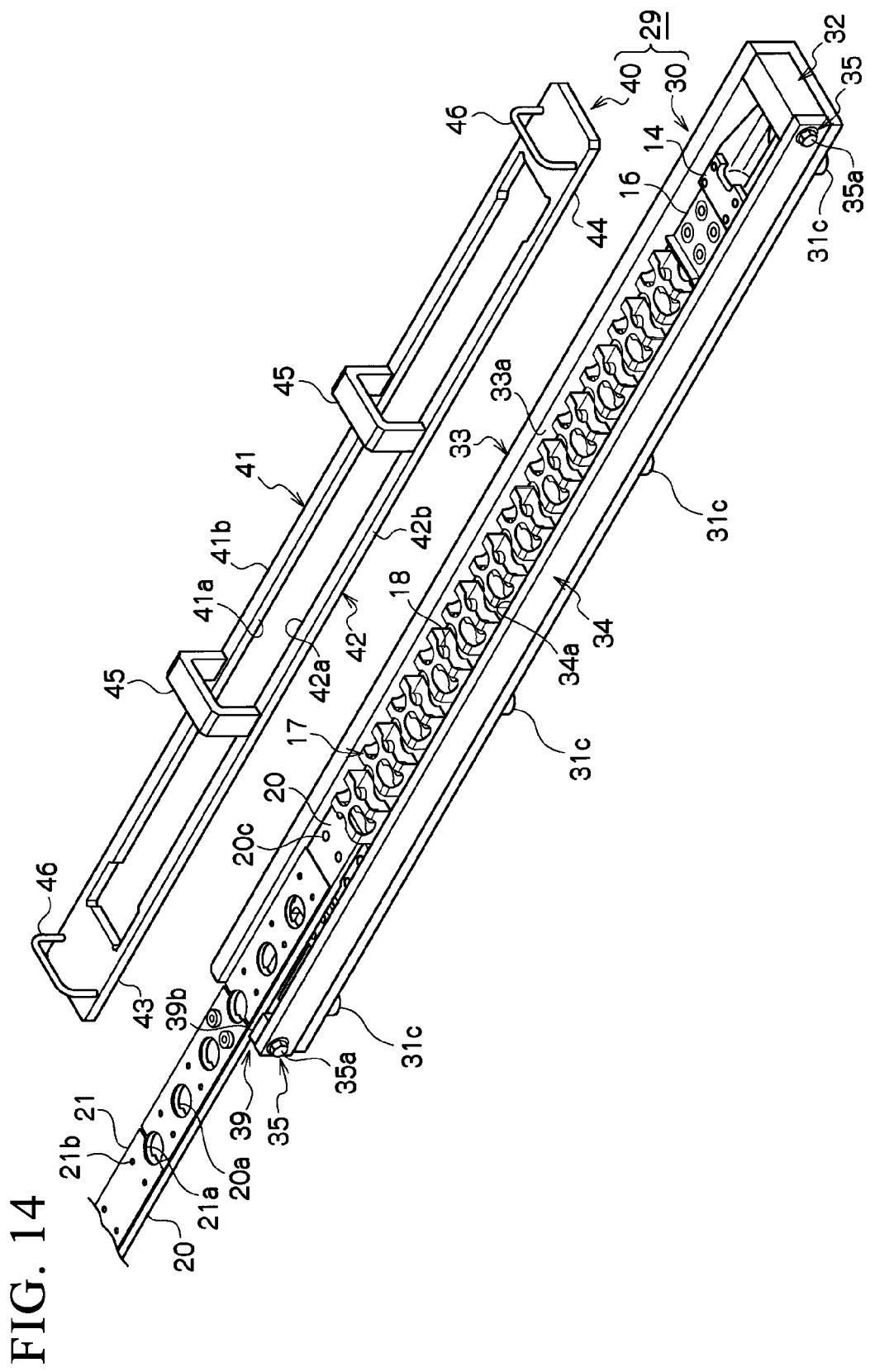
FIG. 14 is a perspective view showing a state in which a stopper part is inserted into the movable guide part by a stopper guide part of the contact plate assembly jig in the contact plate assembly according to the embodiment of the present invention.

The stopper guide part 39 shown in FIGS. 7 to 10 is a member configured to guide the stopper part 20 along a centerline of the plurality of movable guide parts 17 when the stopper part 20 is positioned at the plurality of movable guide parts 17. As shown in FIG. 14, the stopper guide part 39 guides the stopper part 20 to the plurality of movable guide parts 17 such that left and right gaps A2 between inner side surfaces of the movable guide part 17 and both edge sections of the stopper part 20 are equal as shown in FIGS. 4 and 13 when the stopper part 20 is inserted into the plurality of movable guide parts 17. The stopper guide part 39 positions the plurality of movable guide parts 17 and the stopper part 20 such that a center of the plurality of movable guide parts 17 coincides with a center of the stopper part 20. As shown in FIGS. 7, 9, 10 and 14, the stopper guide part 39 is a concave-shaped cutout section formed in the contact plate piece positioning part 32. As shown in FIG. 14, a width of the stopper guide part 39 is slightly larger than that of the stopper part 20. In addition, as shown in FIG. 13, a height of the stopper guide part 39 is slightly larger than the thickness of the stopper part 20. As shown in FIGS. 7 to 10, the stopper guide part 39 includes a guide surface 39*a* configured to come in contact with the lower surface of the stopper part 20 to guide the stopper part 20, and a guide surface 39*b* configured to come in contact with the one side surface of the stopper part 20 to guide the stopper part 20. As shown in FIG. 14, in a state in which the one side surface of the stopper part 20 is in contact with the guide surface 39*b*, as the stopper part 20 is inserted into the plurality of movable guide parts 17, the center of the plurality of movable guide parts 17 coincides with the center of the stopper part 20.

Figure 11A:
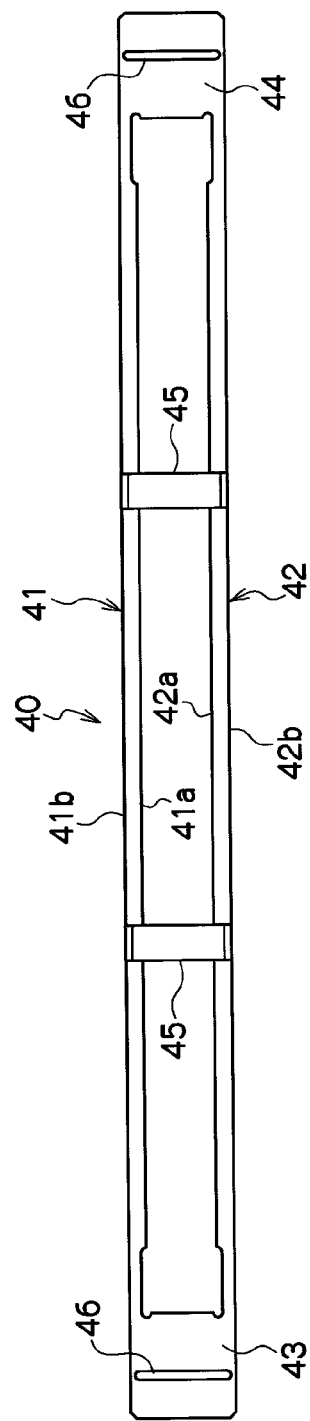
FIG. 11A is an outline plan view of a movable guide assembly jig of the assembly jig of the contact plate assembly according to the embodiment of the present invention.
Figure 11B:
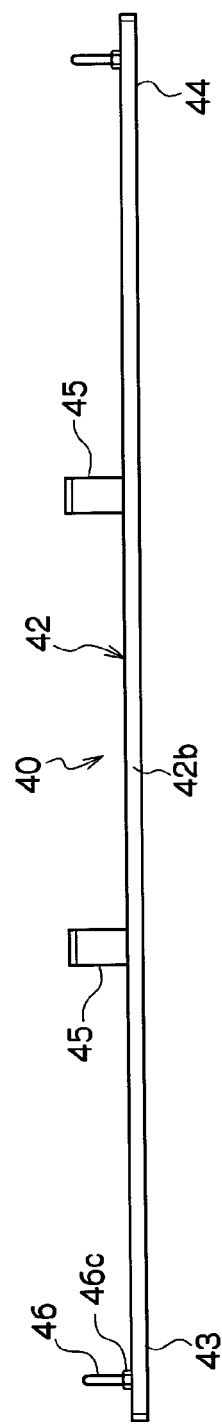
FIG. 11B is an outline side view of the movable guide assembly jig of the assembly jig of the contact plate assembly according to the embodiment of the present invention.
Figure 11C:
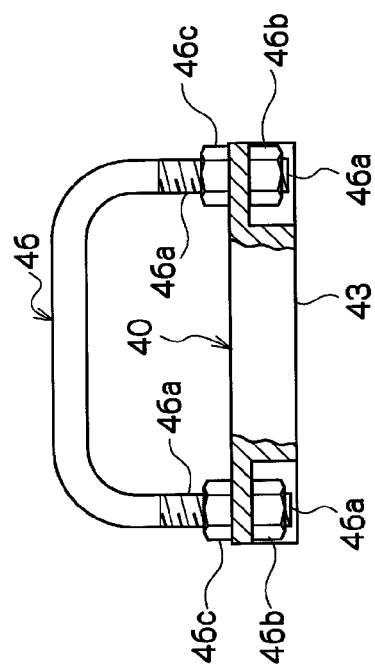
FIG. 11C is an outline front view of the movable guide assembly jig of the assembly jig of the contact plate assembly according to the embodiment of the present invention, a portion of which is broken.

The movable guide assembly jig 40 shown in FIGS. 11A to 13 is a jig configured to linearly align the plurality of movable guide parts 17. The movable guide assembly jig 40 has a function of accurately positioning the movable guide part 17 with respect to the contact plate pieces 13*a* and 13*b* and aligning the sliding surfaces 17*b* of the movable guide parts 17 on the same plane, and a function of preventing variation in posture of the movable guide part 17 when the contact plate pieces 13*a* and 13*b* and the movable guide part 17 are fixed. As shown in FIGS. 11A, 11B and 11C, the movable guide assembly jig 40 is a frame-shaped member formed of a metal and weighing less than the contact plate assembly jig 30 to be easily attached and detached by the operator. A length of the movable guide assembly jig 40 is substantially equal to the entire length of the contact plate 13 as shown in FIGS. 9 and 13. In addition, a width of the movable guide assembly jig 40 is substantially equal to the width of the contact plate pieces 13*a* and 13*b*. The movable guide assembly jig 40 includes movable guide aligning parts 41 and 42 shown in FIGS. 11A to 13, mounting parts 43 and 44 shown in FIGS. 11A, 11B and 11C, a reinforcement part 45 shown in FIGS. 11A, 11B, 11C and 12, a handle part 46 shown in FIGS. 11A to 13, and so on.

Figure 12:
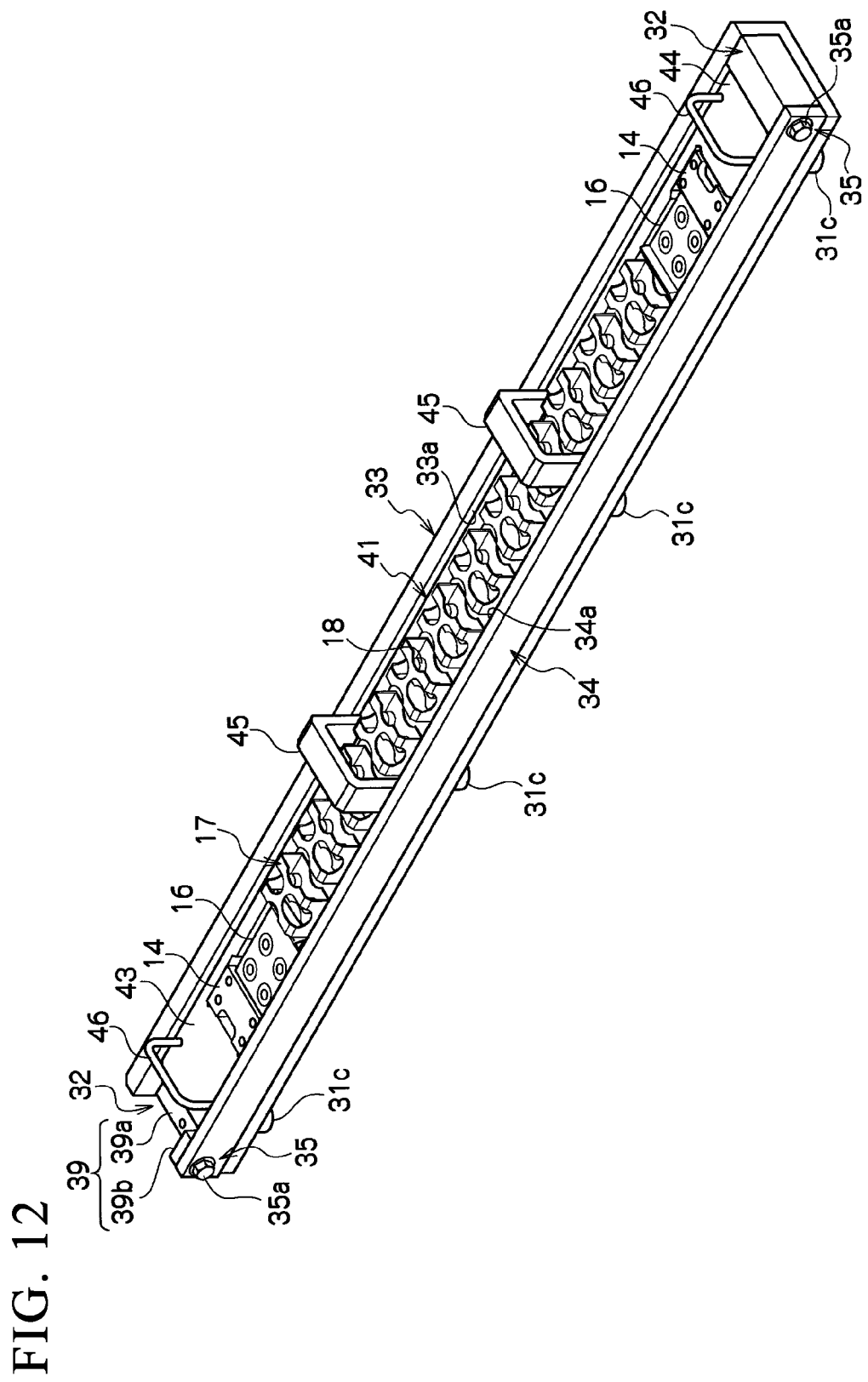
FIG. 12 is a perspective view showing a state in which the movable guide assembly jig of the assembly jig of the contact plate assembly according to the embodiment of the present invention is mounted on the contact plate assembly jig.

The movable guide aligning parts 41 and 42 shown in FIGS. 11A to 13 are members configured to align the plurality of movable guide parts 17 such that the plurality of movable guide parts 17 are arranged in a predetermined direction. The movable guide aligning parts 41 and 42 align the plurality of movable guide parts 17 in a predetermined direction such that the sliding surfaces 17*b* of the plurality of movable guide parts 17 side sliding with the sliding surface 25*b* of the fixing guide part 25 side shown in FIG. 4 form the same plane. As shown in FIGS. 12 and 13, the movable guide aligning parts 41 and 42 sandwich the sliding surface 17*b* of one end section side of the plurality of movable guide parts 17 and the sliding surface 17*b* of the other end section side to linearly align the plurality of movable guide parts 17 and accurately position the movable guide part 17 with respect to the contact plate pieces 13*a* and 13*b*. The movable guide aligning parts 41 and 42 prevent deviation of the plurality of movable guide parts 17 when the plurality of contact plate pieces 13*a* and 13*b* shown in FIG. 9 and the plurality of movable guide parts 17 shown in FIG. 12 are fixed. For example, the movable guide aligning parts 41 and 42 prevent rotation of the movable guide part 17 about the fixing bolt 18*a* and variation in posture of the movable guide part 17 when the fixing bolt 18*a* shown in FIG. 13 is rotated by a fastening tool such as a torque wrench or the like and the contact plate pieces 13a and 13b and the movable guide part 17 are fastened. As shown in FIGS. 12 and 13, the movable guide aligning part 41 can be detachably fitted between the contact plate piece aligning part 33 and the plurality of movable guide parts 17, and further, can be detachably fitted between the contact plate piece aligning part 34 and the plurality of movable guide parts 17. As shown in FIGS. 11A, 11B and 11C, the movable guide aligning parts 41 and 42 are prismatic members having square cross sections. The movable guide aligning parts 41 and 42 have one end sections integrally connected to the mounting part 43 and the other end sections integrally connected to the mounting part 44. As shown in FIGS. 11A, 11B, 11C and 13, the movable guide aligning parts 41 and 42 include aligning surfaces 41a and 42a, bonding surfaces 41b and 42b, and so on.

The aligning surfaces 41a and 42a shown in FIGS. 11A, 11B, 11C and 13 are portions configured to align the sliding surfaces 17b of the plurality of movable guide parts 17. As shown in FIG. 13, the aligning surface 41a comes in contact with the sliding surface 17b of one end section side of the plurality of movable guide parts 17. In addition, the aligning surface 42a comes in contact with the sliding surface 17b of the other end section side of the plurality of movable guide parts 17. As shown in FIG. 11A, the aligning surfaces 41a and 42a are flat surfaces formed in the longitudinal direction of the movable guide aligning parts 41 and 42. As shown in FIG. 13, the bonding surface 41b is a portion joined to the aligning surface 33a of the contact plate piece aligning part 33. In addition, the bonding surface 42b is a portion joined to the aligning surface 34a of the contact plate piece aligning part 34. As shown in FIG. 11A, the bonding surfaces 41b and 42b are flat surface formed along the longitudinal direction of the movable guide aligning parts 41 and 42, and formed in parallel to the aligning surfaces 41a and 42a.

The mounting parts 43 and 44 shown in FIGS. 11A, 11B, 11C and 12 are a portion detachably mounted on the contact plate piece 13b. As shown in FIG. 12, the mounting parts 43 and 44 can be fitted into a gap between the contact plate piece positioning part 32 and the mounting part 14 and a gap between the contact plate piece aligning part 33 and the contact plate piece aligning part 34. The mounting parts 43 and 44 are thin plate-shaped portions having an external shape of substantially a square as shown in FIG. 11A. The mounting part 43 is disposed at one end section of the movable guide assembly jig 40. In addition, the mounting part 44 is disposed at the other end section of the movable guide assembly jig 40.

The reinforcement part 45 shown in FIGS. 11A, 11B, 11C and 12 is a portion configured to reinforce the movable guide aligning parts 41 and 42. As shown in FIG. 12, the reinforcement part 45 is a thin plate-shaped curved member having an external shape of substantially a U shape. The reinforcement part 45 securely connects the movable guide aligning part 41 and the movable guide aligning part 42 to constantly hold an interval between the movable guide aligning part 41 and the movable guide aligning part 42. A height of the reinforcement part 45 is set such that the operator can easily insert his/her hand between the movable guide parts 17 when the contact plate assembly 12 is assembled. Two reinforcement parts 45 are disposed about a central section in the longitudinal direction of the movable guide assembly jig 40 at an equal interval at left and right sides. The reinforcement parts 45 are detachably fixed to the movable guide aligning parts 41 and 42 by fixing members such as bolts or the like (not shown).

The handle part 46 shown in FIGS. 11A to 13 is a portion gripped by the operator when the movable guide assembly jig 40 is attached to and/or detached from the contact plate assembly jig 30. As shown in FIG. 11C, the handle part 46 is a shaft-shaped member bent in substantially a U shape, and detachably fixed to the mounting parts 43 and 44. As shown in FIG. 14, a height of the handle part 46 is set such that the stopper part 20 passes inside the handle part 46 when the stopper part 20 is inserted into the plurality of movable guide parts 17. As shown in FIG. 11C, the handle part 46 includes male screw parts 46a inserted into through-holes of the mounting parts 43 and 44, fixing nuts 46b mounted on tip sections of the male screw parts 46a, and fixing nuts 46c mounted on the male screw parts 46a such that the mounting parts 43 and 44 are sandwiched between the fixing nuts 46b and the fixing nuts 46c. As shown in FIGS. 11A, 11B, 11C and 12, two handle parts 46 are disposed about a central section in the longitudinal direction of the movable guide assembly jig 40 outside the reinforcement parts 45 at an equal interval at left and right sides.

A method of using the assembly jig of the contact plate assembly according to the embodiment of the present invention will be described.

Figure 15:
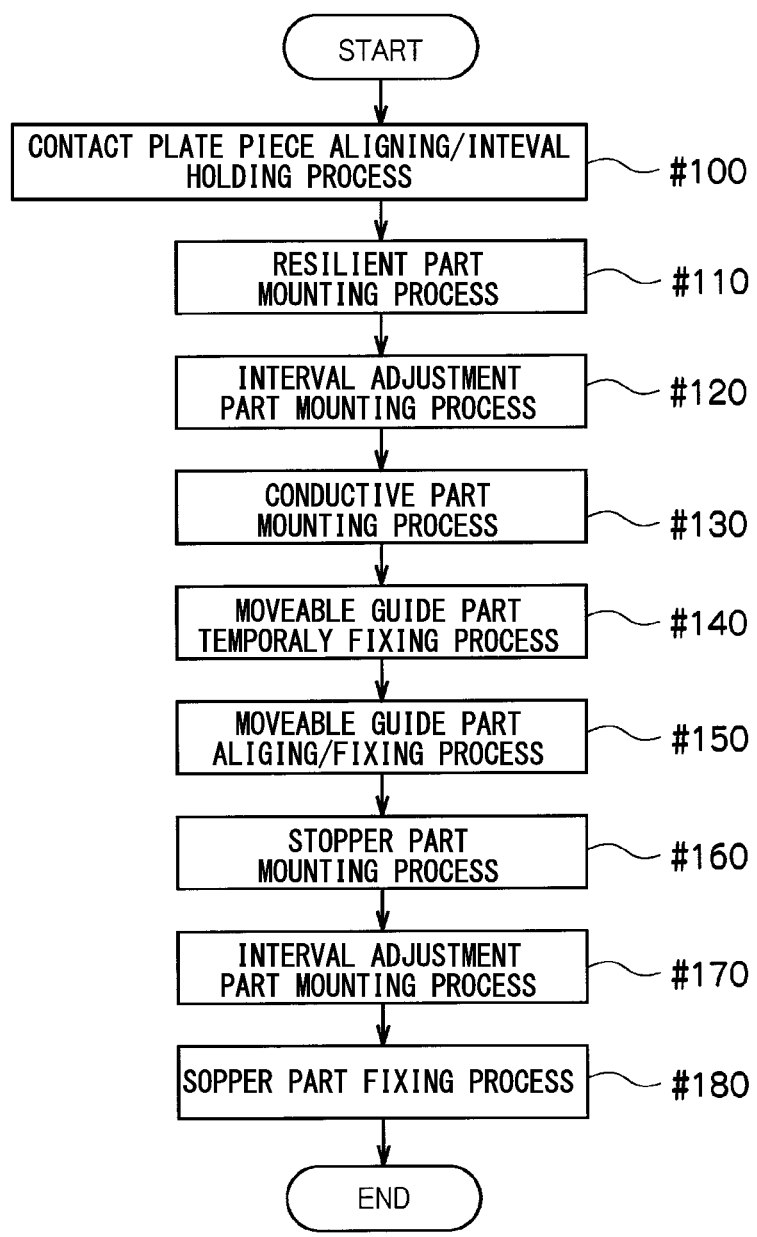
FIG. 15 is a flowchart for describing an assembling sequence when the contact plate assembly is assembled by the assembly jig of the contact plate assembly according to the embodiment of the present invention.
Figure 16:
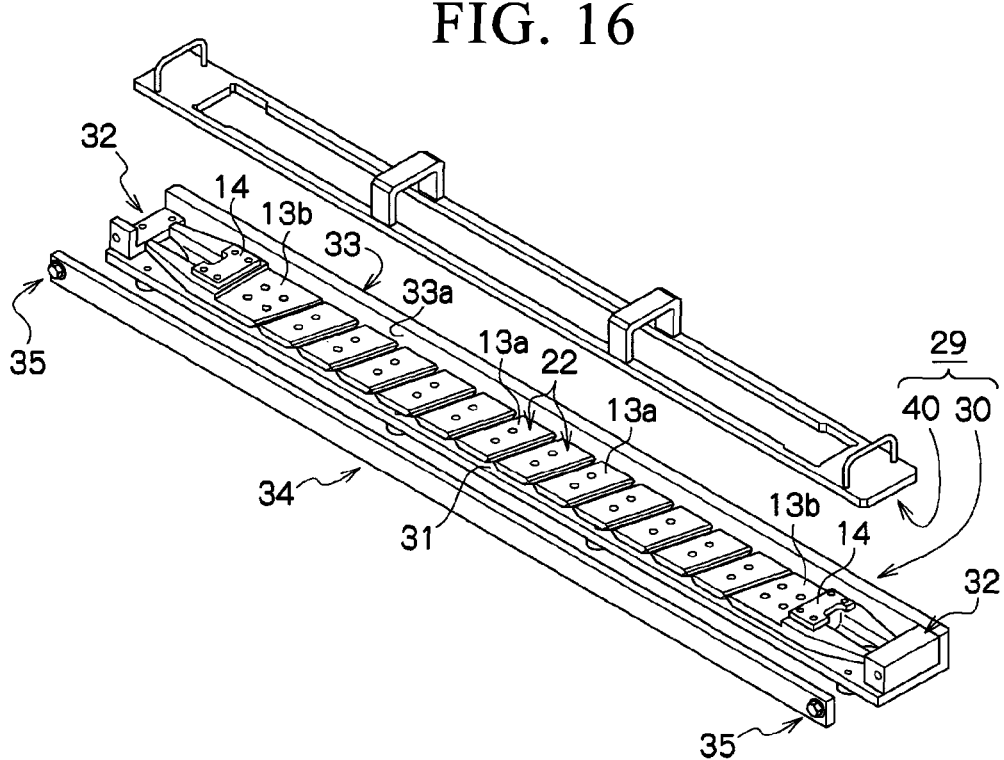
FIG. 16 is a perspective view for describing a contact plate piece aligning/interval holding process by the assembly jig of the contact plate assembly according to the embodiment of the present invention.

A contact plate piece aligning/interval holding process #100 shown in FIG. 15 is a process of aligning the contact plate pieces 13a and 13b in a row and holding the neighboring contact plate pieces 13a and 13b at the predetermined intervals A1. As shown in FIG. 16, the operator arranges the contact plate pieces 13a between the neighboring interval holding parts 36 on the loading part 31 of the contact plate assembly jig 30 one at a time. Further, the operator arranges the contact plate piece 13b between the interval holding part 36 and the contact plate piece positioning part 32 of both ends on the loading part 31 one at a time. Here, the operator arranges the contact plate pieces 13a and 13b on the loading part 31 such that the end surfaces of the contact plate pieces 13a and 13b come in contact with the aligning surface 33a of the contact plate piece aligning part 33. As a result, the contact plate pieces 13a and 13b are linearly arranged on the loading part 31, and the neighboring contact plate pieces 13a and 13b are arranged on the loading part 31 at the predetermined interval $\Delta_1$.

Figure 17:
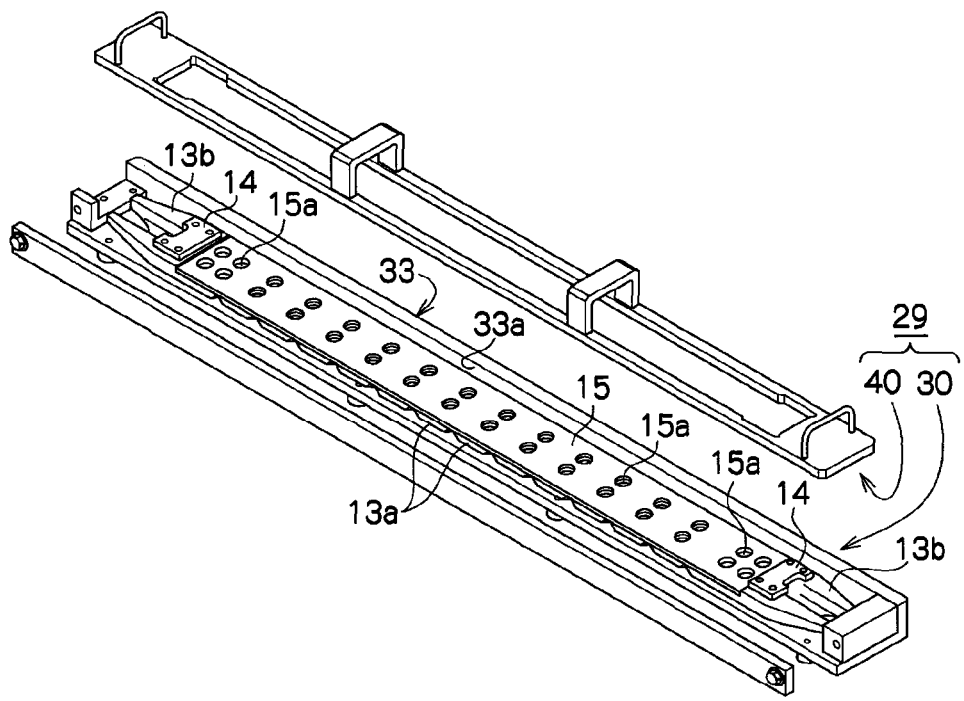
FIG. 17 is a perspective view for describing a resilient part mounting process by the assembly jig of the contact plate assembly according to the embodiment of the present invention.

A resilient part mounting process #110 shown in FIG. 15 is a process of mounting the resilient part 15 on the contact plate pieces 13a and 13b. As shown in FIG. 17, the operator places the resilient part 15 on the contact plate pieces 13a and 13b such that both end sections of the resilient part 15 coincide with stepped sections of the mounting part 14. Here, as one side surface of the resilient part 15 comes in contact with the aligning surface 33a of the contact plate piece aligning part 33, the resilient part 15 is loaded on the contact plate pieces 13a and 13b in a state in which a center of the contact plate pieces 13a and 13b coincides with a center of the resilient part 15.

Figure 18:
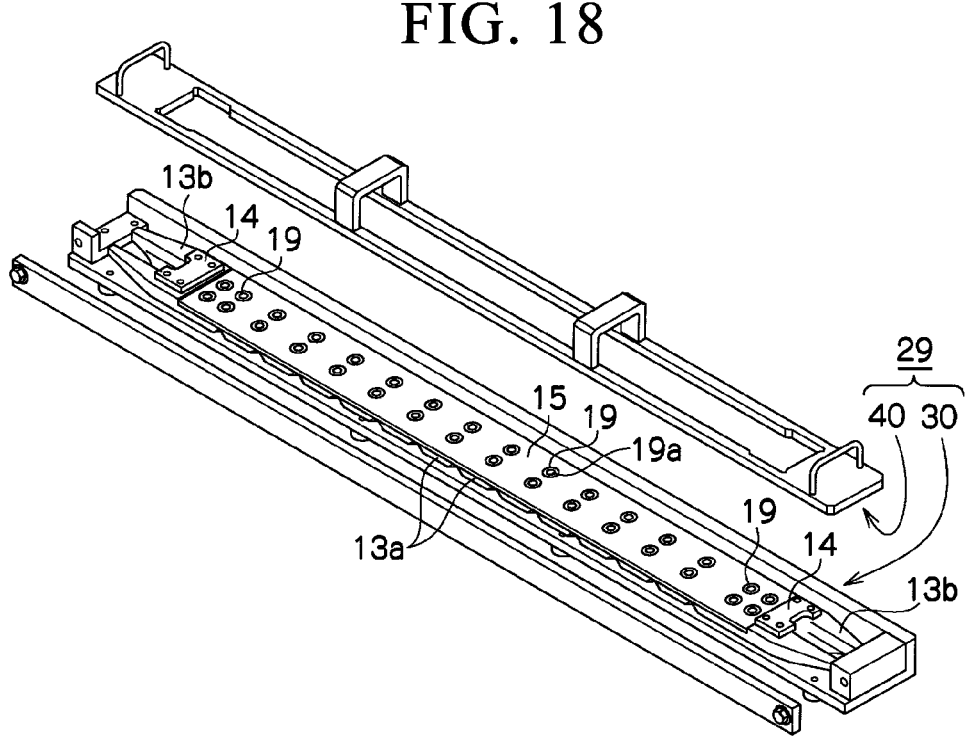
FIG. 18 is a perspective view for describing an interval adjustment part mounting process by the assembly jig of the contact plate assembly according to the embodiment of the present invention.
Figure 19:
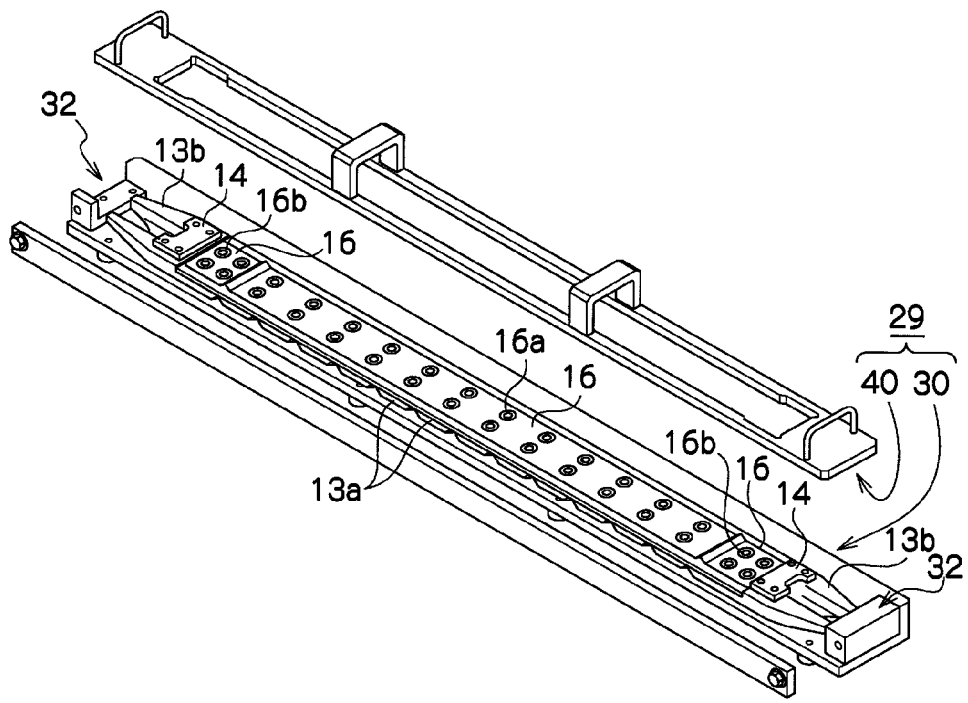
FIG. 19 is a perspective view for describing a conductive part mounting process by the assembly jig of the contact plate assembly according to the embodiment of the present invention.

An interval adjustment part mounting process #120 shown in FIG. 15 is a process of mounting the interval adjustment part 19 on the resilient part 15. A conductive part mounting process #130 is a process of mounting the conductive part 16 on the resilient part 15. As shown in FIG. 18, the operator fits the interval adjustment parts 19 into the through-holes 15a of the resilient part 15 shown in FIG. 17 one at a time, and the interval adjustment part 19 is mounted on the resilient part 15. Next, as shown in FIG. 19, the operator arranges and places the plurality of conductive parts 16 on the resilient part 15 such that tip sections of the conductive parts 16 of both end sections of the plurality of conductive parts 16 coincide with the stepped sections of the mounting part 14. Here, the conductive part 16 is loaded on the resilient part 15 such that the through-hole 19a of the interval adjustment part 19 mounted on the resilient part 15 shown in FIG. 18 coincides with the through-hole 16a of the conductive part 16 shown in FIG. 19.

Figure 20:
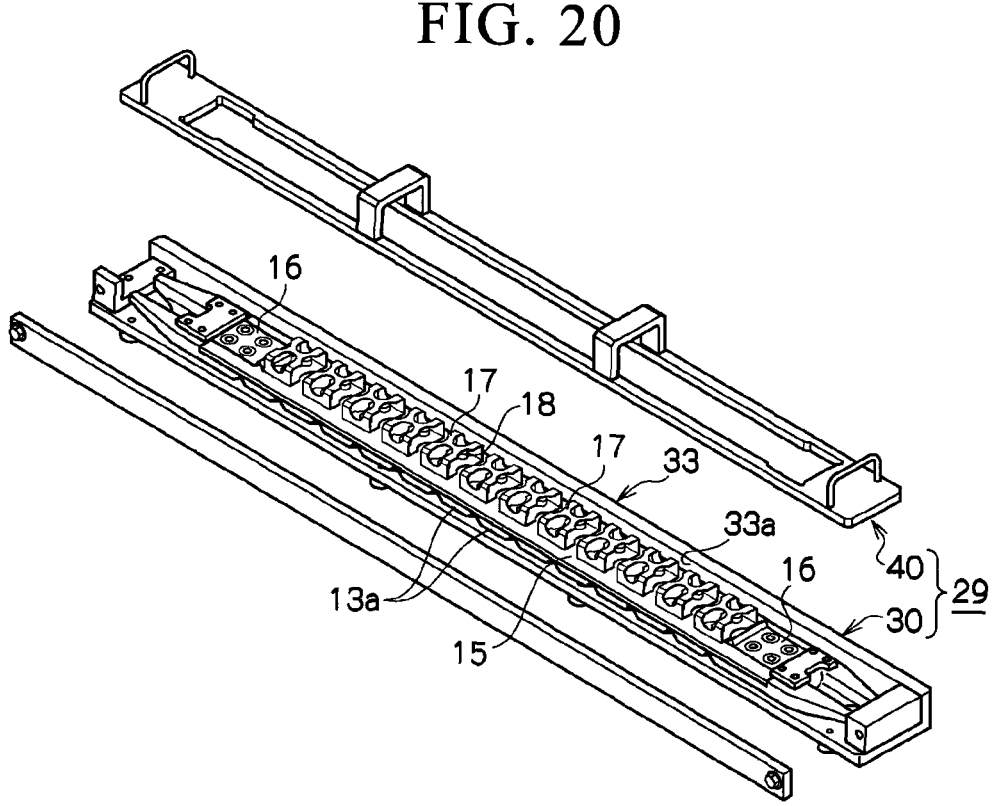
FIG. 20 is a perspective view for describing a movable guide part temporary fixing process by the assembly jig of the contact plate assembly according to the embodiment of the present invention.

A movable guide part temporary fixing process #140 shown in FIG. 15 is a process of temporarily fixing the movable guide parts 17 and the contact plate pieces 13a and 13b by the fixing part 18 in a state in which the movable guide parts 17 are arranged on the conductive parts 16. As shown in FIG. 20, the operator arranges and places the movable guide parts 17 on the conductive parts 16 at predetermined intervals such that the through-hole 16a of the conductive part 16 shown in FIG. 4 coincides with the through-hole 17a of the movable guide part 17. Next, the operator applies a locking agent on the male screw part of the fixing bolt 18a of the fixing part 18 shown in FIG. 4, and inserts the fixing bolt 18a into the through-hole 17a of the movable guide part 17, the through-hole 16a of the conductive part 16, and the through-hole 19a of the interval adjustment part 19. Next, when the operator manually fastens the female screw section 13c of the contact plate piece 13a and the male screw part of the fixing bolt 18a, the contact plate piece 13a and the movable guide part 17 are temporarily fastened by the fixing part 18 as shown in FIG. 20.

Figure 21:
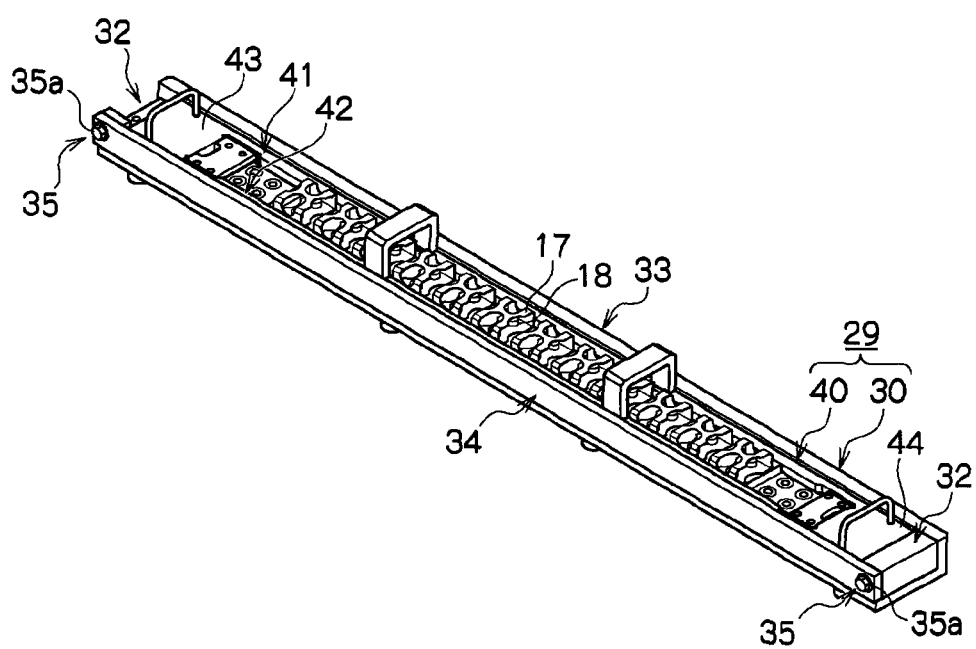
FIG. 21 is a perspective view for describing a movable guide part fixing process by the assembly jig of the contact plate assembly according to the embodiment of the present invention.

A movable guide part aligning/fixing process #150 shown in FIG. 15 is a process of aligning the movable guide parts 17 in a row and fixing the movable guide part 17 and the contact plate piece 13a by the fixing part 18. As shown in FIG. 21, the operator fastens the contact plate piece aligning part 34 to the contact plate piece positioning part 32 by the fixing part 35. As a result, the contact plate piece 13a and the resilient part 15 are sandwiched between the contact plate piece aligning part 33 and the contact plate piece aligning part 34 as shown in FIG. 13. Next, as shown in FIG. 21, the movable guide assembly jig 40 is mounted on the contact plate assembly jig 30. First, when the mounting parts 43 and 44 of the movable guide assembly jig 40 are fitted between the contact plate piece aligning part 33 and the contact plate piece aligning part 34 of the contact plate assembly jig 30 and between the contact plate piece positioning part 32 and the mounting part 14, the mounting parts 43 and 44 are loaded on the contact plate piece 13b. Simultaneously, the movable guide aligning parts 41 and 42 of the movable guide assembly jig 40 are fitted between the aligning surfaces 33a and 34a of the contact plate piece aligning parts 33 and 34 and the sliding surface 17b of the movable guide part 17 shown in FIG. 13, and the movable guide aligning parts 41 and 42 are loaded on the resilient part 15. Here, the movable guide part 17 and the contact plate piece 13a are temporarily fastened by the fixing part 18. For this reason, the operator finely adjusts a posture of the movable guide parts 17 with his/her hand one at a time, and fits the movable guide aligning parts 41 and 42 between the contact plate piece aligning parts 33 and 34 and the movable guide part 17. As a result, as shown in FIG. 21, the sliding surfaces 17b of the plurality of movable guide parts 17 are arranged on the same plane, and the plurality of movable guide parts 17 are linearly arranged in a row. Next, a fastening tool such as a torque wrench or the like is mounted on the fixing bolt 18a of the fixing part 18 shown in FIG. 13. Then, the fixing bolt 18a is finally fastened by the fastening tool until it reaches at a predetermined set torque value (for example, 12.7±1.0 (N·m)). Here, both end sections and both edge sections of the contact plate piece 13a are sandwiched by the contact plate piece aligning parts 33 and 34 shown in FIG. 10 and the neighboring interval holding part 36 shown in FIG. 13, and both end sections of the movable guide part 17 are also sandwiched by the movable guide aligning parts 41 and 42. For this reason, even when the fixing bolt 18a is rotated by the fastening tool, the contact plate piece 13a and the movable guide part 17 are prevented from being rotated about the fixing bolt 18a, and the contact plate piece 13a and the movable guide part 17 are not deviated.

Figure 22:
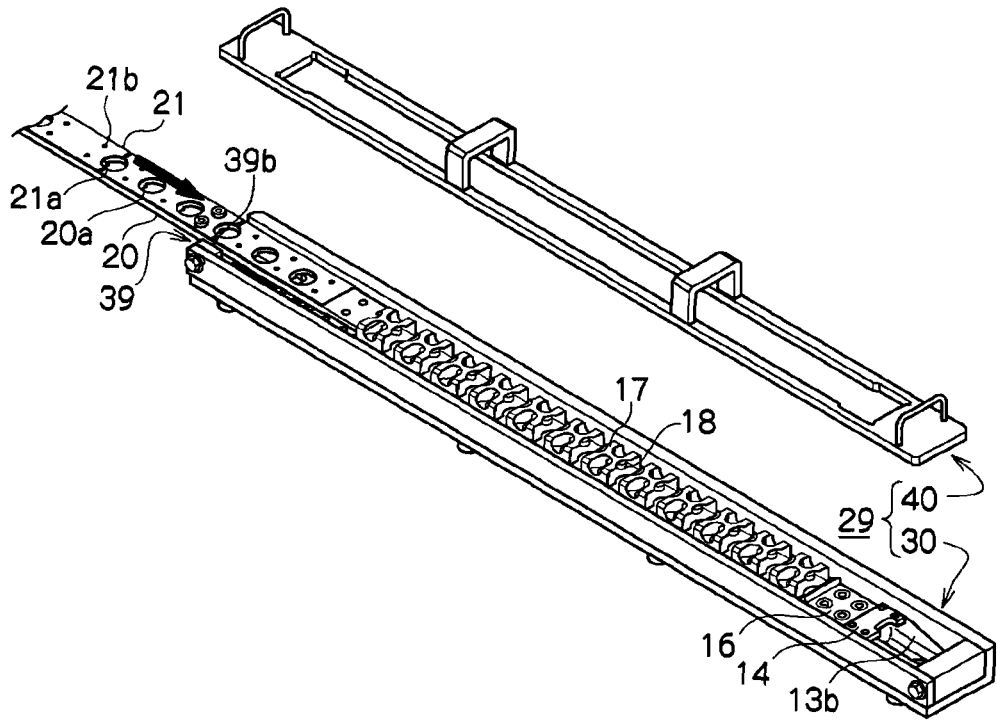
FIG. 22 is a perspective view for describing a stopper part mounting process by the assembly jig of the contact plate assembly according to the embodiment of the present invention.

A stopper part mounting process #160 shown in FIG. 15 is a process of mounting the stopper part 20 on the plurality of movable guide parts 17. As shown in FIG. 22, the movable guide assembly jig 40 is removed from the contact plate assembly jig 30. Then, as the lower surface of the stopper part 20 comes in contact with the guide surface 39a of the stopper guide part 39 shown in FIG. 7, one side surface of the stopper part 20 comes in contact with the guide surface 39b of the stopper guide part 39. Next, as shown in FIG. 22, the operator slides the stopper part 20 toward the movable guide part 17 in the longitudinal direction (the horizontal direction). As a result, in a state in which a center of the stopper part 20 is positioned at a center of the plurality of movable guide parts 17, one end sections of the conductive parts 16 pass through the inside of the plurality of movable guide parts 17 to be sequentially inserted into the plurality of movable guide parts 17. When the operator draws the stopper part 20 until the one end section of the stopper part 20 coincides with the stepped section of the mounting part 14, both end sections of the stopper part 20 are positioned and loaded on the contact plate piece 13b.

Figure 23:
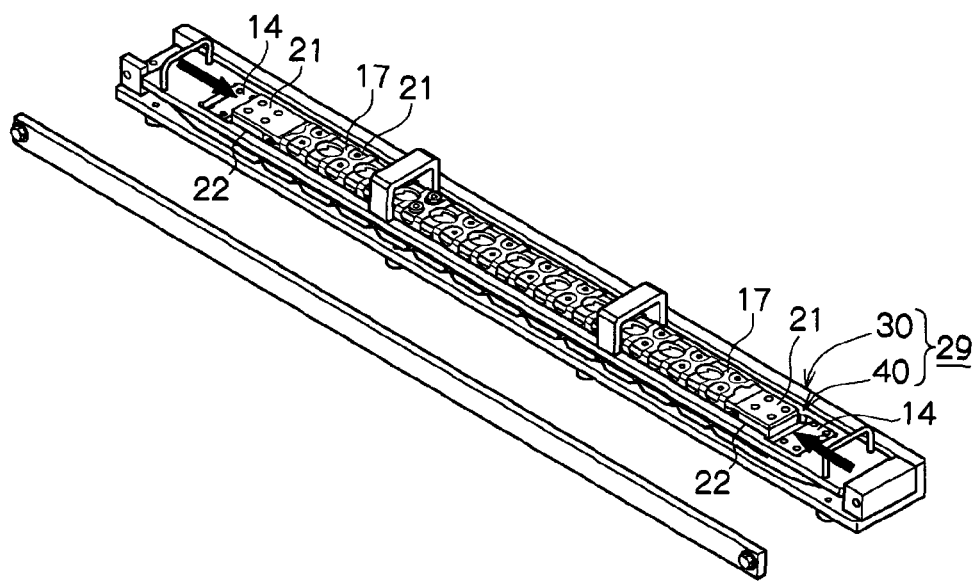
FIG. 23 is a perspective view for describing an interval adjustment part mounting process by the assembly jig of the contact plate assembly according to the embodiment of the present invention.

An interval adjustment part mounting process #170 shown in FIG. 15 is a process of mounting the interval adjustment part 22 between the conductive part 16 and the stopper part 20. As shown in FIG. 23, the interval adjustment part 22 is slid into a gap between the conductive part 16 and the stopper part 20 shown in FIGS. 3B and 6 from the mounting part 14 side in the horizontal direction. When the operator inserts the interval adjustment part 22 between the conductive part 16 and the stopper part 20 until the through-hole 16a of the conductive part 16 and the through-hole 20b of the stopper part 20 coninside with the through-hole 22a of the interval adjustment part 22, the interval adjustment part 22 is completely fitted between the conductive part 16 and the stopper part 20.

Figure 24:
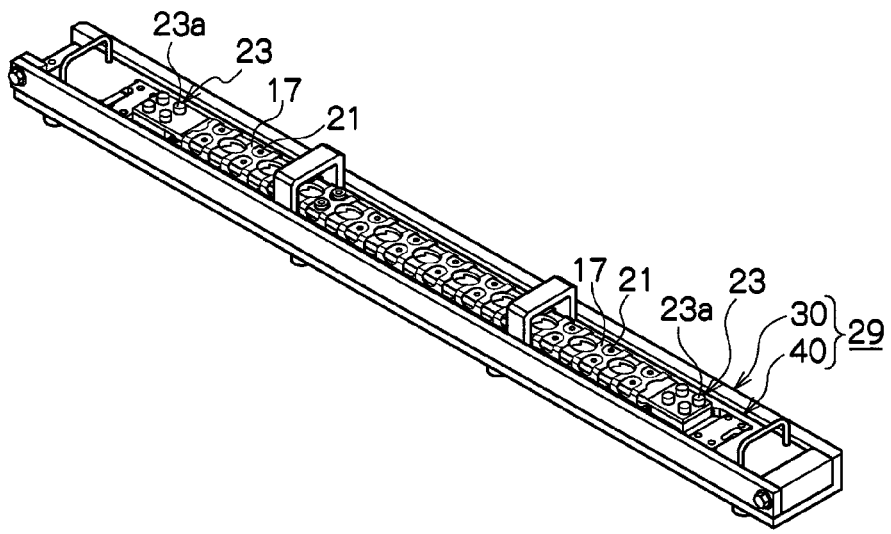
FIG. 24 is a perspective view for describing the interval adjustment part mounting process by the assembly jig of the contact plate assembly according to the embodiment of the present invention.
Figure 25:
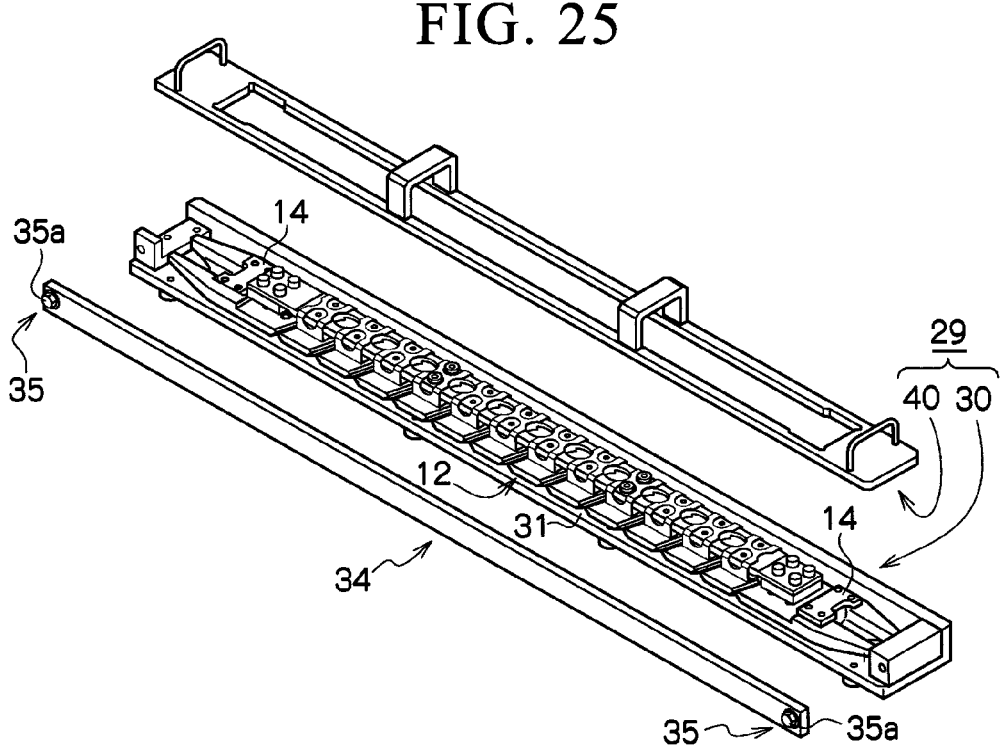
FIG. 25 is a perspective view showing a state after completion of the contact plate assembly assembled by the assembly jig of the contact plate assembly according to the embodiment of the present invention.

A stopper part fixing process #180 shown in FIG. 15 is a process of fixing the stopper part 20 and the contact plate piece 13b by the fixing part 23. As shown in FIG. 24, the fixing bolt 23a of the fixing part 23 is inserted into the through-hole 16a of the conductive part 16, the through-hole 20b of the stopper part 20, and the through-holes 19a and 22a of the interval adjustment parts 19 and 22 shown in FIG. 6. Next, a fastening tool such as a torque wrench or the like is mounted on the fixing bolt 23a. Then, the female screw section 13d of the contact plate piece 13b and the male screw part of the fixing bolt 23a are fastened, and the fixing bolt 23a is fastened by the fastening tool until it reaches at a predetermined set torque value. As a result, as shown in FIGS. 3A and 3B, the entire length of the contact plate 13 is set to a predetermined length. Further, the left and right gaps A2 between the inner side surfaces of the movable guide part 17 and both edge sections of the stopper part 20 are set to the same value as shown in FIG. 4. Next, as shown in FIG. 25, the movable guide assembly jig 40 is removed from the contact plate assembly jig 30. Further, the fixing bolt 35a of the fixing part 35 is unfastened to remove the contact plate piece aligning part 34 from the contact plate assembly jig 30. Finally, the completed contact plate assembly 12 is removed from the loading part 31. Then, the mounting part 14 of the contact plate assembly 12 is fitted to the mounting part 24a of the shoe body frame 24 shown in FIG. 2, the mounting part 14 and the mounting part 24a are fastened by a fixing member such as a fixing bolt or the like (not shown), and the contact plate assembly 12 and the shoe body frame 24 are integrated.

According to the assembly jig of the contact plate assembly according to the embodiment of the present invention, the following effects can be accomplished.

(1) In the embodiment, the plurality of contact plate pieces 13a and 13b are aligned by the contact plate piece aligning parts 33 and 34 such that the plurality of contact plate pieces 13a and 13b are arranged on the loading part 31 in the predetermined direction. Then, the interval holding part 36 holds the neighboring contact plate pieces 13a and 13b at the predetermined interval $A_1$ such that the plurality of contact plate pieces 13a and 13b are arranged on the loading part 31 at the predetermined interval $A_1$. For this reason, the contact plate pieces 13a and 13b can be precisely and accurately arranged, and the contact plate assembly 12 having a large number of parts and a complicated structure can be easily assembled in a short time. For example, in the embodiment, the neighboring contact plate pieces 13a and 13b can be accurately assembled at the interval $A_1$ of 2.0 mm±0.4 mm in a row in a short time of about 20 minutes. In addition, anyone can clearly and precisely assemble the contact plate pieces 13a and 13b in a short time without a specific technique or skillfulness for accurately arranging the number of contact plate pieces 13a and 13b on the surface plate at the predetermined interval $A_1$ and assembling the contact plate pieces 13a and 13b with no deviation. In addition, since the interval AI of the contact plate pieces 13a and 13b is constantly maintained in a state in which the contact plate pieces 13a and 13b are aligned, deviation of the contact plate pieces 13a and 13b can be prevented when the contact plate pieces 13a and 13b and the movable guide part 17 are fastened by the fixing bolt 18a. Further, since the contact plate assembly 12 can be assembled in a short time, costs needed for inspection of the contact plate assembly 12 or exchange of components can be reduced and recyclability can be improved.

(2) In the embodiment, the plurality of movable guide parts 17 are aligned by the movable guide aligning parts 41 and 42 such that the plurality of movable guide parts 17 moving with the plurality of contact plate pieces 13a and 13b are arranged in the predetermined direction. For this reason, the movable guide parts 17 can be precisely and accurately arranged. In addition, the contact plate assembly 12 having a large number of parts and a complicated structure can be easily assembled in a short time.

(3) In the embodiment, the plurality of movable guide parts 17 are aligned by the movable guide aligning parts 41 and 42 in the predetermined direction such that the sliding surfaces 17b of the plurality of movable guide parts 17 side sliding with the sliding surface 25b of the fixing guide part 25 side configured to movably guide the plurality of movable guide parts 17 form the same plane. For this reason, the sliding surfaces 17b of the movable guide parts 17 side are accurately arranged in a row and assembled, and thus the contact plate assembly 12 can be precisely mounted on the shoe body frame 24. As a result, the sliding surface 17b of the movable guide part 17 side and the sliding surface 25b of the fixing guide part 25 side are simply fitted without catching. For this reason, when the contact plate pieces 13a and 13b come in contact with the trolley wire 1a, the contact plate pieces 13a and 13b can be smoothly moved in the upward and downward directions by the movable guide parts 17.

(4) In the embodiment, when the plurality of contact plate pieces 13a and 13b and the plurality of movable guide parts 17 are fixed, deviation of the plurality of movable guide parts 17 is prevented by the movable guide aligning parts 41 and 42. For this reason, the movable guide part 17 can be assembled in the aligned state. As a result, when the contact plate pieces 13a and 13b and the movable guide parts 17 are fastened by the fixing bolts 18a, rotation of the movable guide part 17 about the fixing bolt 18a and variation in posture of the movable guide part 17 can be prevented.

(5) In the embodiment, the movable guide aligning parts 41 and 42 come in contact with the sliding surface 17b of one end section side of the plurality of movable guide parts 17 while contacting the sliding surface 17b of the other end section side of the plurality of movable guide parts 17, aligning the sliding surfaces 17b. For this reason, the sliding surface 17b of the movable guide part 17 side and the sliding surface 25b of the fixing guide part 25 side can be simply fitted without catching. As a result, when the contact plate pieces 13a and 13b come in contact with the trolley wire 1a, the contact plate pieces 13a and 13b can be smoothly moved in the upward and downward direction by the movable guide part 17.

(6) In the embodiment, the contact plate piece positioning part 32 positions the contact plate pieces 13b disposed at both ends of the contact plate pieces 13a and 13b on the loading part 31 at predetermined positions such that the entire length of the contact plate 13 becomes a predetermined length. For this reason, the entire length of the contact plate 13 can be simply adjusted to a prescribed length. In addition, the contact plate 13 can be accurately assembled.

(7) In the embodiment, the contact plate piece positioning part 32 positions the mounting part 14 of the contact plate assembly 12 side at a predetermined position such that the mounting part 14 of the contact plate assembly 12 side is detachably mounted on the mounting part 24a of the shoe body frame 24 side. For this reason, the contact plate assembly 12 can be easily assembled to the shoe body frame 24 without catching the contact plate assembly 12 and the shoe body frame 24.

(8) In the embodiment, when the stopper part 20 configured to restrict a movable range of the plurality of movable guide parts 17 moving with the plurality of contact plate pieces 13a and 13b within a predetermined range is positioned at the plurality of movable guide parts 17, the stopper guide part 39 guides the stopper part 20 along a centerline of the plurality of movable guide parts 17. For this reason, assembly can be performed such that the stopper part 20 is accurately disposed at a center of the movable guide parts 17. As a result, uniform gaps A2 are formed at left and right sides between the inner side surfaces of the movable guide part 17 and both edge sections of the stopper part 20. For this reason, when the contact plate piece 13a comes in contact with the trolley wire 1 a and the movable guide part 17 moves in the upward and downward directions, interference between the movable guide part 17 and the stopper part 20 can be prevented.

(9) In the embodiment, the contact plate piece aligning parts 33 and 34 include the aligning surfaces 33a and 34a configured to come in contact with the end surfaces of the plurality of contact plate pieces 13a and 13b and align the end surfaces of the plurality of contact plate pieces 13a and 13b. For this reason, the contact plate pieces 13a and 13b can be automatically arranged in a row by simply bringing the contact plate pieces 13a and 13b in contact with the aligning surfaces 33a and 34a.

(10) In the embodiment, the interval holding part 36 includes the protrusion sections 36a protruding upward from the loading part 31 in the longitudinal direction of the loading part 31 at the predetermined interval. For this reason, the contact plate pieces 13a and 13b can be automatically arranged at the predetermined interval $A_1$ by only arranging the contact plate pieces 13a and 13b between the neighboring protrusion sections 36a using the protrusion sections 36a as a benchmark.

The present invention is not limited to the above-mentioned embodiment but various modifications and variations as described below may be made.

(1) In the embodiment, an example in which the current collecting apparatus 4 is moved in a flap direction (the traveling direction Lo) in which the contact plate 13 is disposed at a rear side in a traveling direction with respect to the framework 7 has been described. However, the case in which the current collecting apparatus 4 is moved in a counter-flap direction (a reverse direction of the traveling direction Lo) in which the contact plate 13 is disposed at a front side in the traveling direction with respect to the framework 7 may also be applied to the present invention. In addition, in the embodiment, the case in which the current collecting apparatus 4 is a single arm type pantograph has been exemplarily described. However, the present invention may be applied to another type of pantograph such as a rhombic type pantograph, a wing type pantograph, or the like. In addition, in the embodiment, the case in which the present invention is applied to the contact plate assembly 12 used in a pantograph shoe body for the Shinkansen (trademark) has been described. However, when the contact plate assembly 12 is used in a pantograph shoe body for a conventional line, the present invention may be applied to the contact plate assembly 12. Further, in the embodiment, the contact plate 13 constituted by the twelve contact plate pieces 13a and the two contact plate pieces 13b has been exemplarily described. However, the number of contact plate pieces 13a and 13b is not limited to the above-mentioned number.

(2) In the embodiment, the case in which the contact plate piece aligning part 33 is fixed to the loading part 31 and the contact plate piece aligning part 34 becomes detachable and attachable has been described. However, both of the contact plate piece aligning parts 33 and 34 may be fixedly or detachably configured. In addition, in the embodiment, as shown in FIGS. 20 and 21, the case in which the movable guide part 17 is placed on the conductive part 16 and then the movable guide assembly jig 40 is placed on the conductive part 16 has been exemplarily described. However, the movable guide assembly jig 40 may be placed on the conductive part 16 and then the movable guide part 17 may be placed on the conductive part 16. Further, in the embodiment, as shown in FIG. 22, the stopper part 20 is inserted into the movable guide part 17 in a state in which the movable guide assembly jig 40 is removed from the contact plate assembly jig 30. However, the stopper part 20 may be inserted into the movable guide part 17 in a state in which the movable guide assembly jig 40 is mounted on the contact plate assembly jig 30.

(3) In the embodiment, as shown in FIG. 23, the case in which the interval adjustment part 19 is mounted between the stopper part 20 and the conductive part 16 in a state in which the movable guide assembly jig 40 is mounted on the contact plate assembly jig 30 has been described. However, in a state in which the movable guide assembly jig 40 is removed from the contact plate assembly jig 30, the interval adjustment part 19 may be mounted between the stopper part 20 and the conductive part 16. In addition, in the embodiment, as shown in FIG. 23, the case in which the interval adjustment part 19 is mounted between the stopper part 20 and the conductive part 16 in a state in which the contact plate piece aligning part 34 is removed from the contact plate assembly jig 30 has been described. However, in a state in which the contact plate piece aligning part 34 is mounted on the contact plate assembly jig 30, the interval adjustment part 19 may be mounted between the stopper part 20 and the conductive part 16.

INDUSTRIAL APPLICABILITY

According to the assembly jig of the present invention, the contact plate assembly can be precisely and easily assembled in a short time.

DESCRIPTION OF REFERENCE NUMERALS

1 overhead line (electric-car line)
1a trolley wire
2 vehicle
4 current collecting apparatus
9 collector shoe
13 contact plate
13a, 13b contact plate piece
14 mounting part
15 resilient part
16 conductive part
17 movable guide part
17b sliding surface
18 fixing part
19 interval adjustment part
20 stopper part
21 shock absorbing part
22 interval adjustment part
23 fixing part
24 shoe body frame
24a mounting part
25 fixing guide part
25b sliding surface
26 resilient support part
27 fixing part
29 assembly jig
30 contact plate assembly jig
31 loading part
31a protrusion section
32 contact plate piece positioning part
33, 34 contact plate piece aligning part
33a, 34a aligning surface
35 fixing part
36 interval holding part
36a protrusion section
37 interval adjustment part
38 fixing part
39 stopper guide part
39a, 39b guide surface
40 movable guide assembly jig
41, 42 movable guide aligning part
41a, 42a aligning surface
43, 44 mounting part
45 reinforcement part
46 handle part
Lo traveling direction
C contact force
$\Delta_1$ interval
$\Delta_2$ gap

The invention claimed is:

1. An assembly jig of a contact plate assembly used when the contact plate assembly in which a contact plate is divided into a plurality of contact plate pieces in a longitudinal direction is assembled, the assembly jig of the contact plate assembly comprising:
   a loading part which extends along the longitudinal direction of the contact plate and on which the plurality of contact plate pieces are arranged;
   a contact plate piece aligning part which extends along the longitudinal direction of the loading part and protrudes upward from the loading part, the contact plate piece aligning part configured to align the plurality of contact plate pieces such that the plurality of contact plate pieces are arranged on the loading part in the longitudinal direction of the loading part; and an interval holding part configured to hold the neighboring contact plate pieces at a predetermined interval such that the plurality of contact plate pieces are arranged on the loading part at the predetermined interval.

2. The assembly jig of the contact plate assembly according to claim 1, further comprising:

a movable guide aligning part configured to align a plurality of movable guide parts such that the plurality of movable guide parts moving with the plurality of contact plate pieces are arranged in a predetermined direction.

3. The assembly jig of the contact plate assembly according to claim 2, wherein the movable guide aligning part aligns the plurality of movable guide parts in the predetermined direction such that sliding surfaces of the plurality of movable guide parts side sliding with a sliding surface of a fixing guide part side configured to movably guide the plurality of movable guide parts form the same plane.

4. The assembly jig of the contact plate assembly according to claim 2 wherein the movable guide aligning part prevents deviation of the plurality of movable guide parts when the plurality of contact plate pieces and the plurality of movable guide parts are fixed.

5. The assembly jig of the contact plate assembly according to claim 2, wherein the movable guide aligning part includes an aligning surface configured to come in contact with the sliding surfaces of one end section side of the plurality of movable guide parts and come in contact with the sliding surfaces of the other end section side of the plurality of movable guide parts to align the sliding surfaces.

6. The assembly jig of the contact plate assembly according to claim 1, further comprising:

a contact plate piece positioning part configured to position the contact plate pieces disposed at both ends of the contact plate pieces on the loading part at a predetermined position such that the entire length of the contact plate becomes a predetermined length.

7. The assembly jig of the contact plate assembly according to claim 6, wherein the contact plate piece positioning part positions a mounting part of the contact plate assembly side at a predetermined position such that the mounting part of the contact plate assembly side is detachably mounted on a mounting part of a shoe body frame side of a collector shoe.

8. The assembly jig of the contact plate assembly according to claim 1, further comprising:

a stopper guide part configured to guide a stopper part along a centerline of a plurality of movable guide parts when the stopper part configured to restrict a movable range of the plurality of movable guide parts moving with the plurality of contact plate pieces within a predetermined range is positioned at the plurality of movable guide parts.

9. The assembly jig of the contact plate assembly according to claim 1, wherein the contact plate piece aligning part comprises an aligning surface configured to come in contact with end surfaces of the plurality of contact plate pieces and align the plurality of contact plate pieces.

10. The assembly jig of the contact plate assembly according to claim 1, wherein the interval holding part comprises protrusion sections protruding upward from the loading part at a predetermined interval in a longitudinal direction of the loading part.

11. An assembly jig of a contact plate assembly used when the contact plate assembly in which a contact plate is divided into a plurality of contact plate pieces in a longitudinal direction is assembled, the assembly jig of the contact plate assembly comprising:

a movable guide aligning part which extends along the longitudinal direction of the contact plate and is disposed above the contact plate, the movable guide aligning part configured to align a plurality of movable guide parts such that the plurality of movable guide parts moving with the plurality of contact plate pieces are arranged in the longitudinal direction of the contact plate.

12. The assembly jig of the contact plate assembly according to claim 11, wherein the movable guide aligning part aligns the plurality of movable guide parts in the predetermined direction such that sliding surfaces of the plurality of movable guide parts side sliding with a sliding surface of a fixing guide part side configured to movably guide the plurality of movable guide parts form the same plane.

13. The assembly jig of the contact plate assembly according to claim 11, wherein the movable guide aligning part prevents deviation of the plurality of movable guide parts when the plurality of contact plate pieces and the plurality of movable guide parts are fixed.

14. The assembly jig of the contact plate assembly according to claim 11, wherein the movable guide aligning part includes an aligning surface configured to come in contact with the sliding surfaces of one end section side of the plurality of movable guide parts and come in contact with the sliding surfaces of the other end section side of the plurality of movable guide parts to align the sliding surfaces.

15. The assembly jig of the contact plate assembly according to claim 11, further comprising:

a contact plate piece positioning part configured to position the contact plate pieces disposed at both ends of the contact plate pieces at a predetermined position such that the entire length of the contact plate becomes a predetermined length.

16. The assembly jig of the contact plate assembly according to claim 15, wherein the contact plate piece positioning part positions a mounting part of the contact plate assembly side at a predetermined position such that the mounting part of the contact plate assembly side is detachably mounted on a mounting part of a shoe body frame side of a collector shoe.

17. The assembly jig of the contact plate assembly according to claim 11, further comprising:

a stopper guide part configured to guide a stopper part along a centerline of the plurality of movable guide parts when the stopper part configured to restrict a movable range of the plurality of movable guide parts moving with the plurality of contact plate pieces within a predetermined range is positioned at the plurality of movable guide parts.

18. The assembly jig of the contact plate assembly according to claim 11, wherein the contact plate piece aligning part comprises an aligning surface configured to come in contact with end surfaces of the plurality of contact plate pieces and align the plurality of contact plate pieces.

* * * * *